US012159602B2

(12) United States Patent
Tsuchiya et al.

(10) Patent No.: US 12,159,602 B2
(45) Date of Patent: Dec. 3, 2024

(54) LIQUID CRYSTAL DISPLAY DEVICE AND METHOD FOR CONTROLLING LIQUID CRYSTAL DISPLAY DEVICE

(71) Applicant: Sharp Display Technology Corporation, Kameyama (JP)

(72) Inventors: Hiroshi Tsuchiya, Kameyama (JP); Koji Murata, Kameyama (JP); Takashi Satoh, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/126,340

(22) Filed: Mar. 24, 2023

(65) Prior Publication Data

US 2023/0317028 A1 Oct. 5, 2023

(30) Foreign Application Priority Data

Mar. 29, 2022 (JP) ................................. 2022-053513

(51) Int. Cl.
*G09G 3/36* (2006.01)

(52) U.S. Cl.
CPC ..... *G09G 3/3696* (2013.01); *G09G 2320/028* (2013.01); *G09G 2320/04* (2013.01); *G09G 2320/066* (2013.01); *G09G 2320/068* (2013.01)

(58) Field of Classification Search
CPC ........... G09G 3/3696; G09G 2320/028; G09G 2320/04; G09G 2320/066; G09G 2320/068; G09G 2320/046
See application file for complete search history.

(56) References Cited

U.S. PATENT DOCUMENTS 6,630,978 B2 * 10/2003 Hiroshi ............. G02F 1/134363 349/128
7,190,429 B2 * 3/2007 Yoshida ................ G02F 1/1393 349/40
8,144,138 B2 * 3/2012 Kim ..................... G09G 3/3648 345/204
8,436,805 B2 * 5/2013 Yamada ............ G02F 1/133707 345/87
8,610,838 B2 * 12/2013 Kim ....................... H04N 13/31 349/95

(Continued)

FOREIGN PATENT DOCUMENTS

JP 2007-178907 A 7/2007
JP 2021-067852 A 4/2021

*Primary Examiner* — Michael J Jansen, II
(74) *Attorney, Agent, or Firm* — ScienBiziP, P.C.

(57) ABSTRACT

A liquid crystal display device includes: an active matrix substrate including a first electrode and a second electrode configured to generate a transverse electrical field; a counter substrate including a plurality of third electrodes disposed at predetermined intervals and having a stripe pattern; a liquid crystal layer located between the active matrix substrate and the counter substrate; and a control circuit. The liquid crystal display device can display an image in a first viewing angle mode and a second viewing angle mode having a viewing angle narrower than the first viewing angle mode by the control circuit switching an amplitude and a waveform of a voltage applied to the third electrodes. The control circuit applies a common voltage having a different value to the first electrode or the second electrode in each of the first viewing angle mode and the second viewing angle mode.

4 Claims, 16 Drawing Sheets

(56) References Cited

U.S. PATENT DOCUMENTS 8,686,994 B2* 4/2014 Lin ...................... H04N 13/315 349/8
9,274,356 B2* 3/2016 Kim ...................... H04N 13/366
9,798,169 B2* 10/2017 Su ...................... G02F 1/1337
9,963,635 B2* 5/2018 Xie ...................... G02F 1/1323
10,473,996 B2* 11/2019 Ono ...................... G02F 1/13306
10,649,283 B2* 5/2020 Chung ...................... G02F 1/13306
10,809,551 B2* 10/2020 Chung ...................... G02F 1/133514
11,092,851 B2* 8/2021 Robinson ...................... G02B 5/3016
11,187,928 B2* 11/2021 Chung ...................... G09G 3/36
11,269,204 B2* 3/2022 Chung ...................... G02F 1/1323
11,315,509 B2* 4/2022 Qiao ...................... G09G 3/3614
11,506,945 B2* 11/2022 Murata ...................... G02F 1/13439
12,055,804 B2* 8/2024 Dong ...................... G02F 1/13737
2001/0010574 A1* 8/2001 Hiroshi ...................... G02F 1/134363 349/181
2004/0066480 A1* 4/2004 Yoshida ...................... G02F 1/133707 349/123
2010/0097359 A1* 4/2010 Yamada ...................... G02F 1/133707 345/205
2010/0123692 A1* 5/2010 Kim ...................... G09G 3/3648 345/204
2011/0157171 A1* 6/2011 Lin ...................... H04N 13/315 345/419
2011/0170026 A1* 7/2011 Lin ...................... G02B 30/31 349/15
2012/0120363 A1* 5/2012 Ishihara ...................... G02F 1/133711 349/141
2013/0127831 A1* 5/2013 Kim ...................... H04N 13/31 345/87
2013/0342586 A1* 12/2013 Kim ...................... G02B 30/27 349/15
2015/0002497 A1* 1/2015 Dong ...................... G09G 3/3655 345/87
2015/0049128 A1* 2/2015 Iwata ...................... G02F 1/134309 345/690
2017/0059898 A1* 3/2017 Su ...................... G02F 1/1337
2017/0166813 A1* 6/2017 Xie ...................... C09K 19/0275
2018/0164622 A1* 6/2018 Ono ...................... G02F 1/136286
2019/0086706 A1* 3/2019 Robinson ...................... G02B 5/3083
2019/0179180 A1* 6/2019 Chung ...................... G02F 1/1323
2019/0278117 A1* 9/2019 Chung ...................... G02F 1/1343
2019/0302539 A1* 10/2019 Shinada ...................... G09G 3/3225
2020/0159050 A1* 5/2020 Chung ...................... G02F 1/1323
2021/0124223 A1* 4/2021 Murata ...................... G02F 1/133512
2021/0286206 A1* 9/2021 Chung ...................... G02F 1/1323
2021/0350757 A1* 11/2021 Qiao ...................... G09G 3/3648
2022/0236595 A1* 7/2022 Dong ...................... G02B 6/0068

* cited by examiner

LIQUID CRYSTAL DISPLAY DEVICE AND METHOD FOR CONTROLLING LIQUID CRYSTAL DISPLAY DEVICE

CROSS-REFERENCE TO RELATED APPLICATIONS

This application claims the benefit of priority to Japanese Patent Application Number 2022-053513 filed on Mar. 29, 2022. The entire contents of the above-identified application are hereby incorporated by reference.

BACKGROUND

Technical Field

The disclosure relates to a liquid crystal display device and a method for controlling a liquid crystal display device.

A liquid crystal display device displays an image by controlling a transmission amount of light, using the alignment of liquid crystal molecules. Thus, a viewing angle can be narrowed depending on the alignment of liquid crystal molecules. In order to solve this problem, techniques for widening a viewing angle such as $UV^2A$, IPS, PSA, and FFS are developed.

On the other hand, in a case where a liquid crystal display device is used in a mobile terminal such as a smartphone or a notebook computer, peeping at the mobile terminal used in a public space may be a problem, for example. In particular, with the spread of new ways of working such as telework and remote work, liquid crystal display devices mounted on mobile terminals may be required to have a narrow viewing angle in order to prevent peeping.

Therefore, for example, as disclosed in JP 2007-178907 A, a liquid crystal display device that can control a viewing angle is studied.

SUMMARY

An object of the disclosure is to provide a liquid crystal display device and a method for controlling a liquid crystal display device that can switch a viewing angle by more appropriate control.

A liquid crystal display device according to an embodiment of the disclosure includes: an active matrix substrate including at least one first electrode and at least one second electrode configured to generate a transverse electrical field; a counter substrate including a plurality of third electrodes disposed at predetermined intervals and having a stripe pattern; a liquid crystal layer located between the active matrix substrate and the counter substrate; and a control circuit. The liquid crystal display device can display an image in a first viewing angle mode and a second viewing angle mode having a viewing angle narrower than a viewing angle of the first viewing angle mode by the control circuit switching an amplitude and a waveform of a voltage applied to the third electrodes. The control circuit applies a common voltage having a different value to the first electrode or the second electrode in each of the first viewing angle mode and the second viewing angle mode.

According to an embodiment of the disclosure, there is provided a liquid crystal display device and a method for controlling a liquid crystal display device that can switch a viewing angle by more appropriate control.

BRIEF DESCRIPTION OF DRAWINGS

The disclosure will be described with reference to the accompanying drawings, wherein like numbers reference like elements.

DESCRIPTION OF EMBODIMENTS

Figure 1:
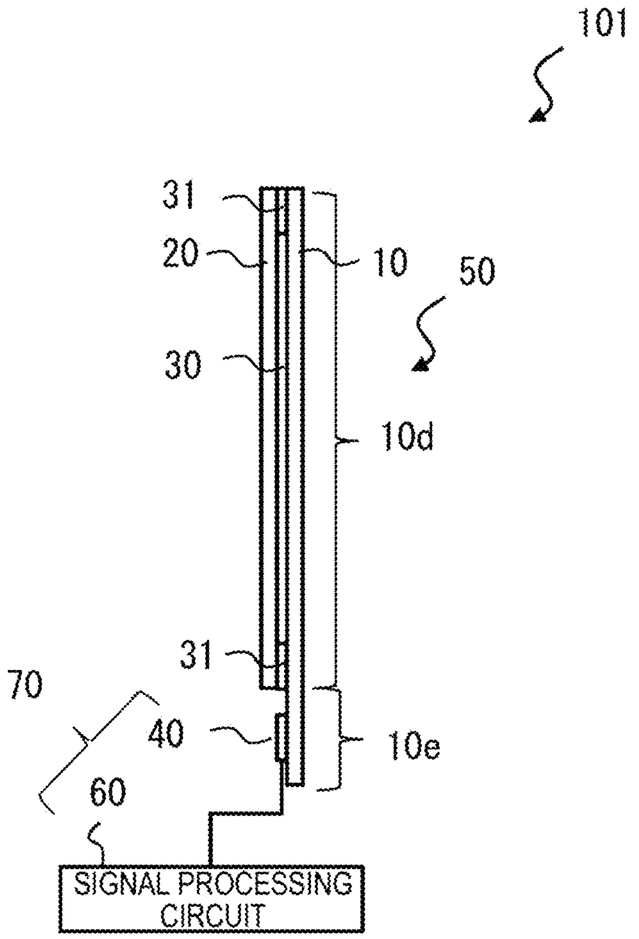
FIG. 1 is a schematic view illustrating an overall configuration of a liquid crystal display device according to a first embodiment.

Embodiments of the disclosure will be described below with reference to the drawings. The disclosure is not limited to the following embodiments, and appropriate design changes can be made within a scope that satisfies the configuration of the disclosure. Further, in the description below, the same reference signs may be used in common among the different drawings for portions having the same or similar functions, and descriptions of repetitions thereof may be omitted. Furthermore, the configurations described in the embodiments and other embodiments may be combined or modified as appropriate within a range that does not depart from the gist of the disclosure. For ease of explanation, in the drawings referenced below, the configuration may be simplified or schematically illustrated, or a portion of the components may be omitted. Dimensional ratios between components illustrated in the drawings are not necessarily indicative of actual dimensional ratios. A "row direction" means a horizontal direction (X direction) of a screen of a display device, and a "column direction" means a vertical direction (Y direction) of the screen of the display device. Further, in the drawings referred to below, various electrodes are displayed with hatching in order to facilitate the identification of the various electrodes.

First Embodiment

Configuration of Liquid Crystal Display Device

FIG. 1 is a schematic view illustrating a configuration of a liquid crystal display device 101 according to the present embodiment. The liquid crystal display device 101 according to the present embodiment includes a liquid crystal panel 50 and a liquid crystal panel controller 70. The liquid crystal panel 50 includes an active matrix substrate 10, a counter substrate 20, and a liquid crystal layer 30 located between the active matrix substrate 10 and the counter substrate 20. The active matrix substrate 10 and the counter substrate 20 are bonded to each other with a seal 31 so as to have a predetermined gap therebetween, and the liquid crystal layer 30 is disposed between the active matrix substrate 10 and the counter substrate 20 in a region surrounded by the seal 31.

The liquid crystal panel controller (control circuit) 70 includes a signal processing circuit 60 and a drive circuit 40. As will be described later, the signal processing circuit 60 receives an original image signal and a signal for switching a viewing angle from the outside of the liquid crystal display device 101, and outputs a drive signal to the liquid crystal panel 50.

In the liquid crystal panel 50, the active matrix substrate 10 includes a display region 10*d* at a position facing the counter substrate 20. Further, the active matrix substrate 10 includes a non-display region 10*e* outside the display region 10*d*, and the drive circuit 40 is provided in the non-display region 10*e*. The display region 10*d* includes a plurality of pixel regions arranged in a two dimensional matrix shape, and one pixel of the liquid crystal panel 50 is arranged in each of the pixel regions.

Figure 2:
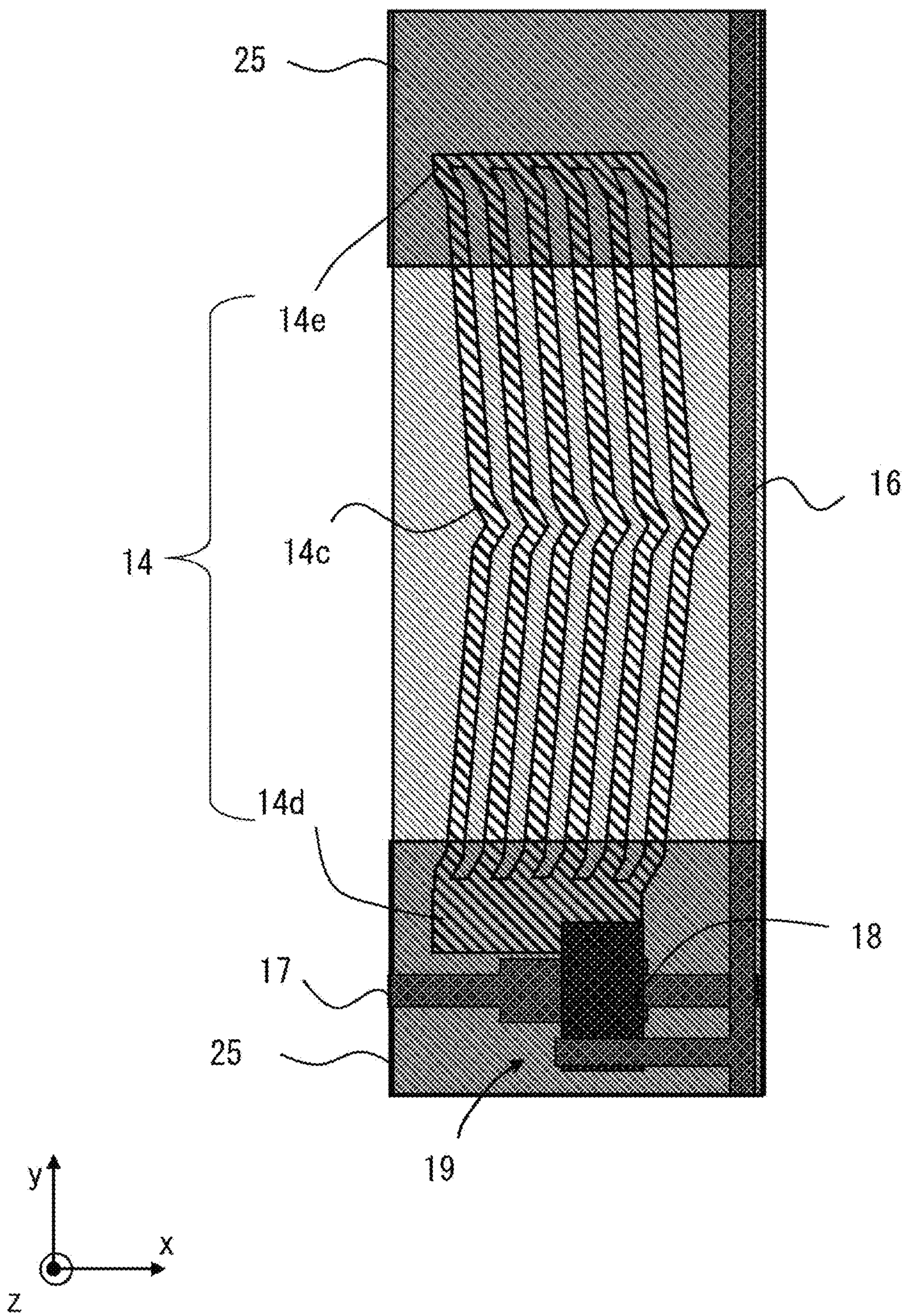
FIG. 2 is a plan view illustrating a main structure of one pixel of a liquid crystal panel.
Figure 3:
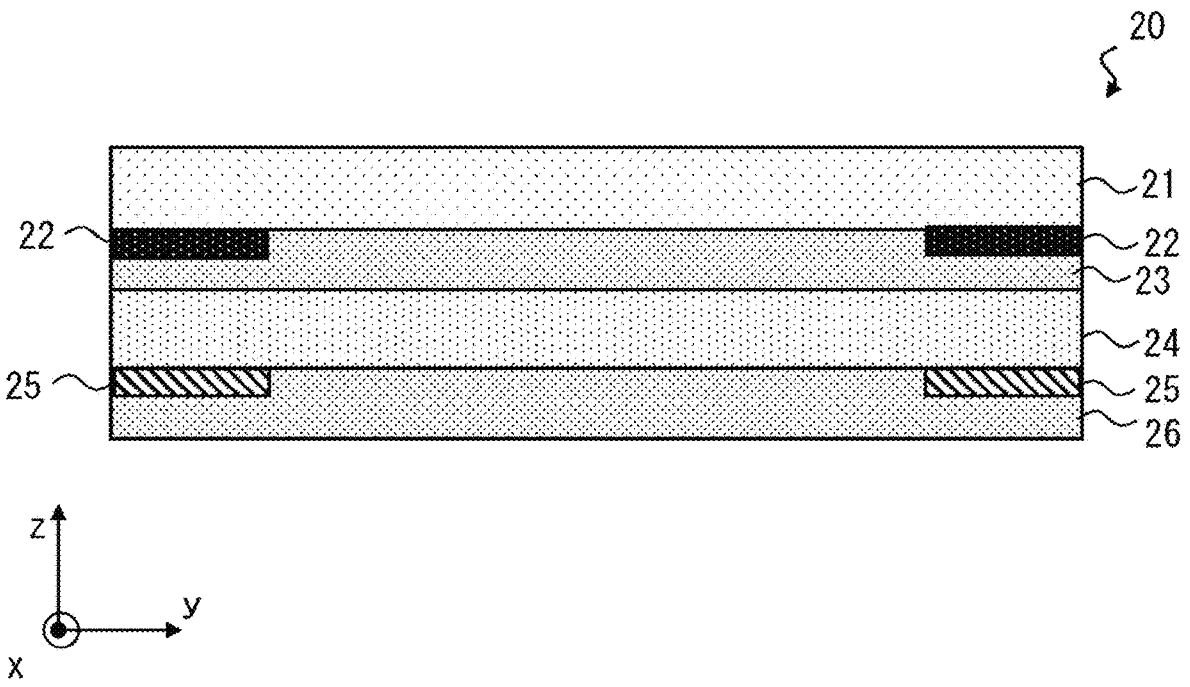
FIG. 3 is a cross-sectional view illustrating a structure corresponding to one pixel of a counter substrate.
Figure 4:
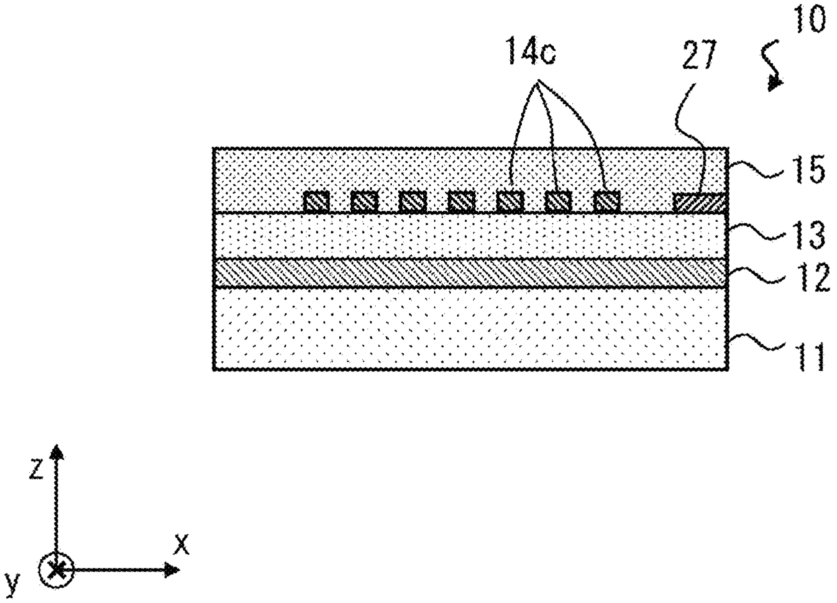
FIG. 4 is a cross-sectional view illustrating a structure corresponding to one pixel of an active matrix substrate.

FIG. 2 is a plan view illustrating a main structure of one pixel of the liquid crystal panel. FIG. 3 is a cross-sectional view illustrating a structure corresponding to one pixel of the counter substrate 20. FIG. 4 is a cross-sectional view illustrating a structure corresponding to one pixel of the active matrix substrate 10. In FIG. 3, the counter substrate 20 is illustrated in a cross section along the column direction (y direction). In FIG. 4, the active matrix substrate 10 is illustrated in a cross section along the row direction (x direction).

The active matrix substrate 10 includes a first substrate 11, a first electrode 12, an insulating layer 13, a second electrode 14, and an alignment film 15. The first substrate 11 supports each constituent element formed on the active matrix substrate 10, and is made of a transparent material such as glass or resin.

The first electrode 12 is preferably disposed on the first substrate 11 in a region overlapping with at least an optical opening of each pixel region, and may be, for example, a solid electrode. The optical opening is a region surrounded by a black matrix to be described later. The first electrode 12 may be disposed at each pixel, or may be continuously disposed over a plurality of pixels or the entire display region. Preferably, the first electrode 12 is formed of, for example, a transparent electrode material such as indium tin oxide (ITO) or indium zinc oxide (IZO).

The insulating layer 13 is disposed on the first electrode 12 so as to cover at least the entire first electrode 12. The insulating layer 13 is made of an inorganic material such as silicon oxide, silicon nitride, or silicon oxynitride.

The second electrode 14 is located on the insulating layer 13. In the present embodiment, the second electrode 14 is a pixel electrode. As illustrated in FIG. 2, the second electrode 14 include a plurality of electrode portions 14*c* having a stripe pattern, a connection portion 14*d*, and a connection portion 14*e*. Each of the electrode portions 14*c* has a bending part, has a V shape extending in the column direction (y direction, first direction) as a whole, and is arrayed in the row direction (x direction, second direction) at predetermined intervals. One ends of the electrode portions 14*c* are connected to each other by the connection portion 14*d* and the other ends are connected to each other by the connection portion 14*e*. Thus, the second electrode 14 has a V shape and includes a plurality of slits arrayed in the row direction. Preferably, the second electrode 14 is also made of a transparent electrode material such as ITO or IZO.

The alignment film 15 is located on the insulating layer 13 so as to cover the second electrode 14. The alignment film 15 controls an initial alignment direction of liquid crystal molecules included in the liquid crystal layer 30 in a state in which no effective voltage is applied to the liquid crystal layer 30. The alignment film 15 is preferably a horizontal alignment film that aligns liquid crystal molecules in a horizontal direction. For example, a pretilt angle of the alignment film 15 is preferably about 0° to 1°.

The active matrix substrate 10 can display an image by separately controlling a plurality of pixels. For this purpose, the active matrix substrate 10 includes a switching element such as a transistor or a diode in each pixel region. As illustrated in FIG. 2, in the present embodiment, the active matrix substrate 10 includes a plurality of TFTs 19, a plurality of source wiring lines 16, and a plurality of gate wiring lines 17 disposed in each pixel region. The plurality of source wiring lines 16 extends in the column direction, and the plurality of gate wiring lines 17 extends in the row direction. The TFT 19 includes a semiconductor layer 18, and a central portion of the semiconductor layer 18 overlaps with the gate wiring line 17 via an insulating film. One end of the semiconductor layer 18 is electrically connected to the second electrode 14 that is a pixel electrode, and the other end is electrically connected to the source wiring line 16. The gate wiring line 17 and the source wiring line 16 are made of, for example, a metal material such as aluminum, copper, titanium, molybdenum, chromium, or an alloy thereof.

The counter substrate 20 includes a second substrate 21, a black matrix 22, a color filter 23, an overcoat layer 24, a third electrode 25, and an alignment film 26.

The second substrate 21 supports each constituent element formed on the counter substrate 20, and is made of a transparent material such as glass or resin. The black matrix 22 is disposed at an outer periphery of each pixel of the liquid crystal panel 50 in a plan view. Specifically, the black matrix 22 is disposed so as to overlap with the source wiring line 16 and the gate wiring line 17. The black matrix 22 is made of, for example, a black resin.

The color filter 23 is disposed on the second substrate 21. For example, a red, blue, or green color filter 23 is arranged corresponding to each pixel.

The overcoat layer 24 is located on the color filter 23. The overcoat layer 26 is a dielectric made of a resin material, for example.

The third electrode 25 is located on the overcoat layer 24. The third electrode 25 is located at both ends in the column direction in each pixel, and is continuous with a third electrode 25 of a pixel adjacent in the row direction. That is, a plurality of third electrodes 25 is arrayed in the column direction at predetermined intervals so as to have a stripe shape extending in the row direction. The third electrode 25 overlaps with the black matrix 22 in a plan view. The third electrode 25 may be a transparent electrode or may be a metal electrode including aluminum, molybdenum, chromium, titanium, or an alloy thereof.

The alignment film 26 is located on the overcoat layer 24 so as to cover the third electrodes 25. Similarly to the alignment film 15, the alignment film 26 also controls an initial alignment direction of the liquid crystal molecules included in the liquid crystal layer 30 in a state in which no effective voltage is applied to the liquid crystal layer 30. The alignment film 26 is preferably a horizontal alignment film that aligns liquid crystal molecules in a horizontal direction. For example, a pretilt angle of the alignment film 26 is preferably about 0° to 1°.

The liquid crystal layer 30 includes liquid crystal molecules. Preferably, the liquid crystal molecules have a positive value of anisotropy of dielectric constant (As) defined by the following equation (positive type). Further, preferably, the liquid crystal molecules are homogeneously aligned in a state in which no voltage is effectively applied (no voltage applied state). The long axis direction of the liquid crystal molecules in a no voltage applied state is also referred to as a direction of the initial alignment of the liquid crystal molecules. $\Delta\varepsilon$=(dielectric constant in a long axis direction of the liquid crystal molecules)−(dielectric constant in a short axis direction of the liquid crystal molecules)

The active matrix substrate 10 controls the alignment of liquid crystal molecules of the liquid crystal layer 30 in a fringe field switching (FFS) method. Specifically, by applying a voltage between the first electrode 12 and the second electrode 14, a transverse electrical field, that is, an electrical field in a direction parallel to the active matrix substrate 10 is generated, and the liquid crystal molecules of the liquid crystal layer 30 are arrayed in a lateral direction (horizontal direction). In this liquid crystal alignment state, since the liquid crystal molecules are arrayed in the lateral direction, a wide viewing angle is obtained. This display state is referred to as a first viewing angle mode. In the first viewing angle mode, an image is displayed at a wide viewing angle.

On the other hand, the plurality of third electrodes 25 are disposed at the counter substrate 20, and the liquid crystal molecules arrayed in the lateral direction are tilted from the horizontal direction by adjusting a voltage applied to the third electrodes 25. Thus, the viewing angle of the liquid crystal panel 50 is narrowed. This display state is referred to as a second viewing angle mode. In the second viewing angle mode, the viewing angle is narrower than that in the first viewing angle mode, and an image is displayed at a relatively narrow viewing angle.

Figure 5:
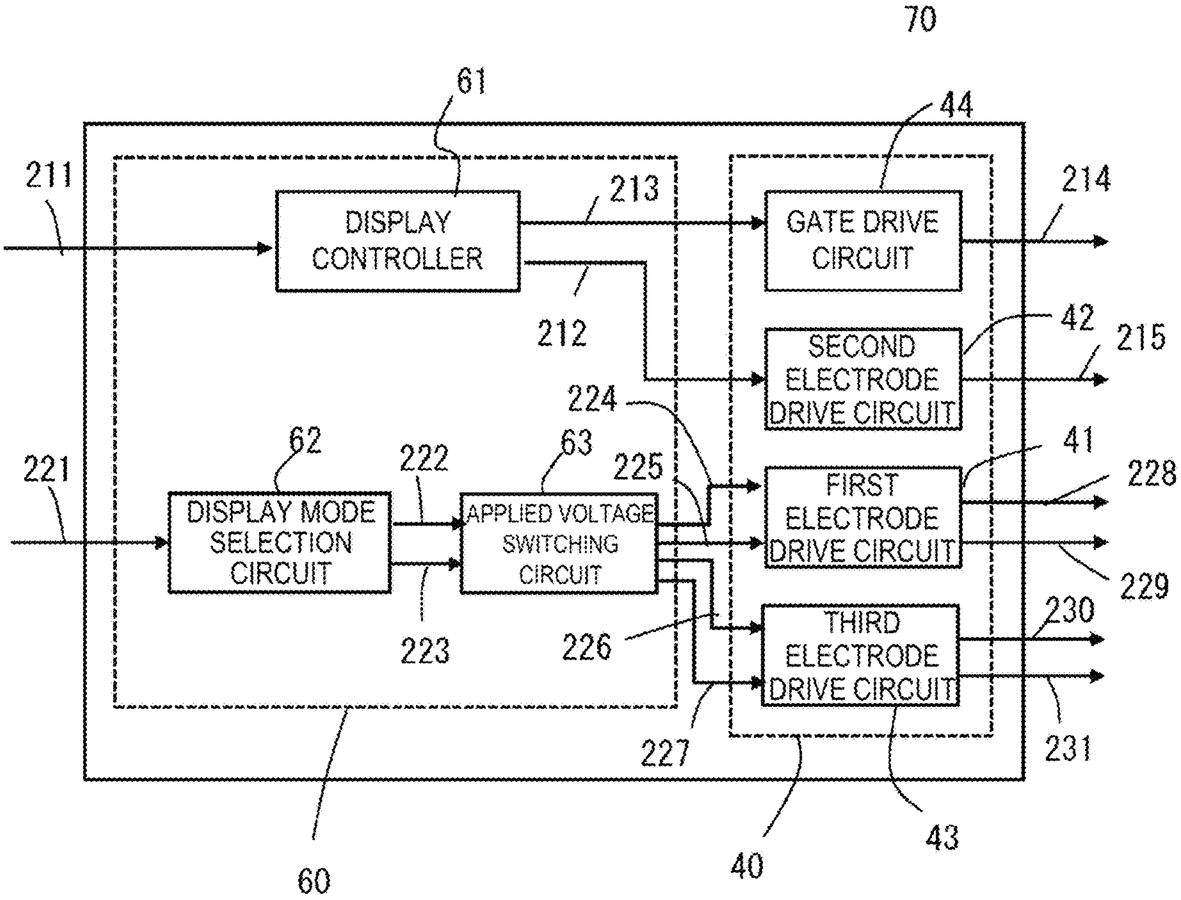
FIG. 5 is a block diagram illustrating an example of a liquid crystal panel controller.

In order to perform such voltage control, the liquid crystal display device 101 includes the liquid crystal panel controller 70. FIG. 5 is a block diagram illustrating an example of the liquid crystal panel controller 70. As described above, the liquid crystal panel controller 70 includes the signal processing circuit 60 and the drive circuit 40. In the present embodiment, in the liquid crystal panel controller 70, the drive circuit 40 is provided at the active matrix substrate 10 of the liquid crystal panel 50, and the signal processing circuit 60 is provided at a circuit substrate other than the liquid crystal panel 50. However, a part or whole of the drive circuit 40 may be provided at a circuit substrate other than the liquid crystal panel 50.

The signal processing circuit 60 includes, for example, a display controller 61, a display mode selection circuit 62, and an applied voltage switching circuit 63. The drive circuit 40 includes, for example, a first electrode drive circuit 41, a second electrode drive circuit 42, a third electrode drive circuit 43, and a gate drive circuit 44.

The display controller 61 receives an original image signal 211 for displaying a desired image from the outside, and generates an image signal 212 corresponding to the original image signal 211. The display controller 61 also generates a control signal 213 for scanning the gate wiring lines 17. In the image signal 212, a luminance level (gray scale) of each pixel of an image to be displayed is converted into a voltage level. The liquid crystal display device 101 is driven by an AC signal in order to suppress image sticking. Thus, the image signal 212 is also a rectangular wave signal having equal amplitude levels on a positive side and a negative side with respect to a reference potential.

The display mode selection circuit 62 receives a display mode switching signal 221 for switching between the first viewing angle mode and the second viewing angle mode. The display mode selection circuit 62 may select a viewing angle mode different from the current viewing angle mode every time the display mode switching signal 221 is received.

Alternatively, the display mode switching signal 221 may include a first display mode switching signal for selecting the first viewing angle mode and a second display mode switching signal for selecting the second viewing angle mode, and the display mode selection circuit 62 may select an appropriate viewing angle mode depending on which signal is received.

When the first viewing angle mode is selected, the display mode selection circuit 62 outputs a first viewing angle mode selection signal 222 to the applied voltage switching circuit 63. When the second viewing angle mode is selected, the display mode selection circuit 62 outputs a second viewing angle mode selection signal 223 to the applied voltage switching circuit 63.

The applied voltage switching circuit 63 switches signals to be input to the first electrode drive circuit 41 and the third electrode drive circuit 43 in accordance with the input viewing angle mode selection signal. When the first viewing angle mode selection signal 222 is received, the applied voltage switching circuit 63 outputs a first common voltage 224 that is a constant voltage and a first common voltage 226 that is a constant voltage. When the second viewing angle mode selection signal 223 is received, a second common voltage 225 that is a constant voltage and a rectangular wave voltage 227 that is an alternating voltage with respect to a reference voltage are output.

The drive circuit 40 receives a signal generated by the signal processing circuit 60 and drives the liquid crystal panel 50. Specifically, the gate drive circuit 44 receives a control signal 213 and applies a scanning signal 214 to the gate wiring lines 17. The second electrode drive circuit 42 receives an image signal 212 and applies a data signal 215 to the source wiring lines 16.

The first electrode drive circuit 41 applies a first common voltage 228 to the first electrode 12 when the first viewing angle mode is selected, and applies a second common voltage 229 to the first electrode 12 when the second viewing angle mode is selected. The third electrode drive circuit 43 applies a first common voltage 230 to the third electrodes 25 when the first viewing angle mode is selected, or applies a rectangular wave 231, which is a drive signal for generating a vertical electrical field, to the third electrodes 25 when the second viewing angle mode is selected.

As will be described in detail below, according to a detailed study by the inventors of the present application, it has been found that, when a liquid crystal panel is configured by disposing a counter substrate including a third electrode disposed at an FFS mode active matrix substrate and a viewing angle is limited, image sticking may occur in the liquid crystal panel when the liquid crystal panel is used in a narrow viewing angle mode.

In the liquid crystal display device according to the disclosure, the common voltage applied to the first electrode is differentiated between the first viewing angle mode that is a wide viewing angle mode and the second viewing angle mode that is a narrow viewing angle mode. That is, by setting the first common voltage 228 and the second common voltage 229 to be different values, the above-described image sticking is suppressed in the liquid crystal panel. The second common voltage 229 is preferably less than the first common voltage 228.

When an amplitude Vc of the rectangular wave 231 is x (V) and the first common voltage 228 and the second common voltage 229 are respectively $V_{com1}$ (V) and $V_{com2}$ (V), it is preferable that the following equation (1) is satisfied.

$$V_{com2}=V_{com1}+ax \text{ (where } a<0) \qquad (1)$$

Further, when a common voltage in a liquid crystal display device including an active matrix substrate having electrodes for generating a transverse electrical field, a counter substrate having no third electrode, and a liquid crystal layer located between the active matrix substrate and the counter substrate is $V_{com}$, the first common voltage 228 and the second common voltage 229 are preferably shifted from $V_{com}$ by an offset voltage y (V) represented by the following equation (2).

$$y=ax+b \text{ (where } a<0,\ b\geq 0) \qquad (2)$$

Here, it is preferable that the a and the b satisfy the following inequalities.

$$-0.025<a<-0.015$$

$$0<b<0.2$$

More preferably, the a and the b satisfy the following inequalities.

$$-0.024<a<-0.016$$

$$0.05<b<0.15$$

According to a study by the inventors of the present application, it has been found that, when the amplitude Vc (=x (V)) of a rectangular wave 231 is determined, the image sticking of the liquid crystal panel can be suppressed by setting the first common voltage 228 and the second common voltage 229 so as to satisfy the above equation (1) or (2).

Operations and Control Method of Liquid Crystal Display Device 101

Figure 6A:
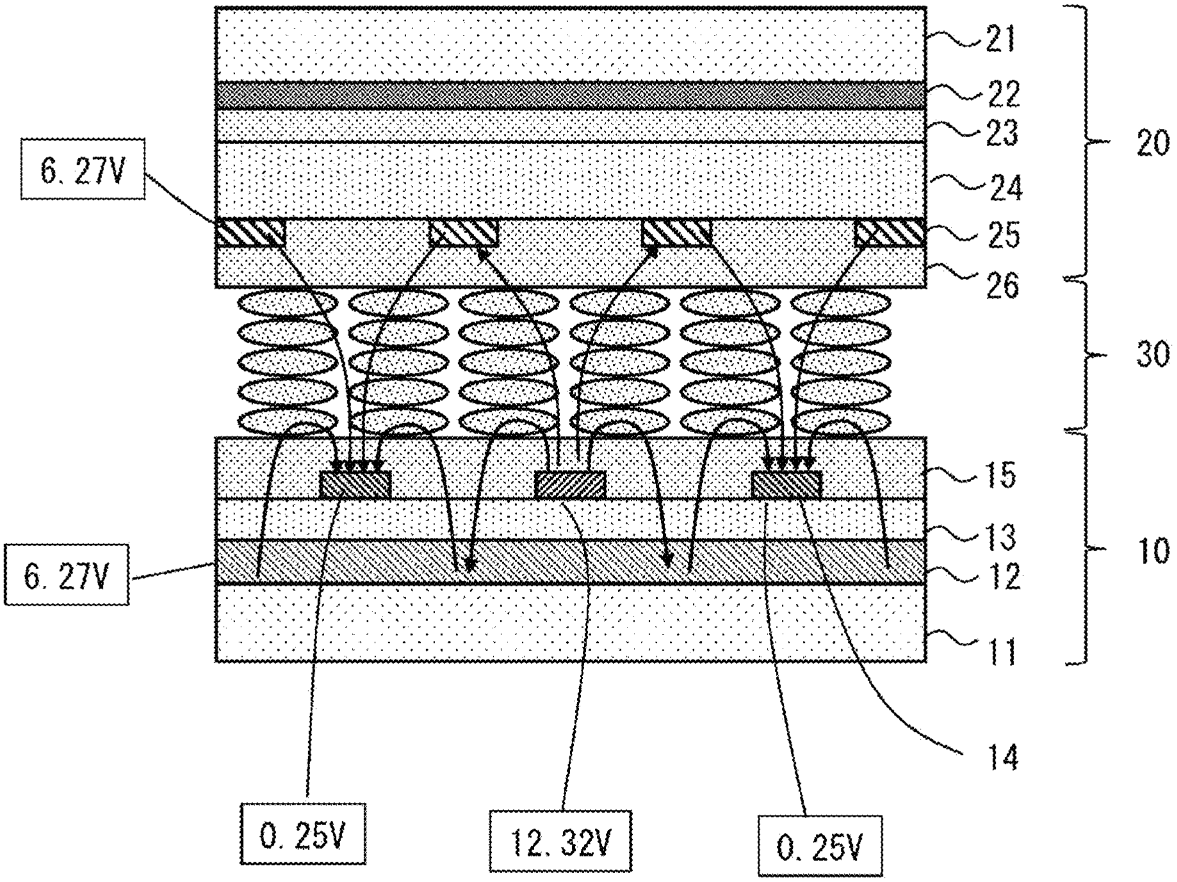
FIG. 6A is a schematic view illustrating the alignment of liquid crystal molecules when a liquid crystal panel is driven in a first viewing angle mode.
Figure 6B:
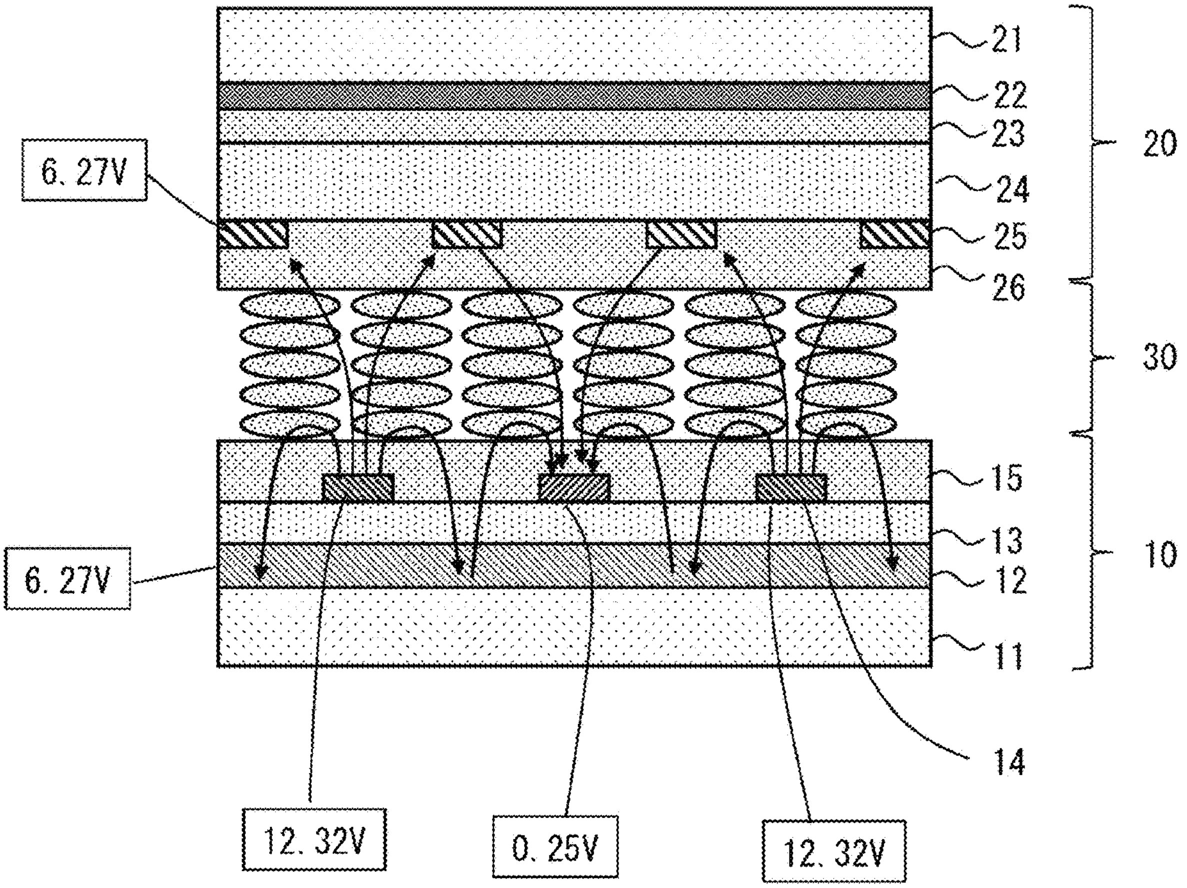
FIG. 6B is a schematic view illustrating the alignment of liquid crystal molecules when the liquid crystal panel is driven in the first viewing angle mode.

Operations and a control method of the liquid crystal display device 101 according to the present embodiment will be described. FIGS. 6A, 6B, 7A, 7B, 8A and 8B are schematic views illustrating the alignment of liquid crystal molecules when the liquid crystal panel is driven in the first viewing angle mode and the second viewing angle mode in the liquid crystal display device according to the present embodiment. FIGS. 6A and 6B illustrate the alignment of liquid crystal molecules in the first viewing angle mode, and FIGS. 7A, 7B, 8A, and 8B illustrate the alignment of liquid crystal molecules in the second viewing angle mode. In these drawings, the same constituent elements as those of the liquid crystal panel illustrated in FIGS. 2 to 4 are denoted by the same reference signs. However, in order to present the alignment of liquid crystal molecules in an easy-to-understand manner, the structure of the liquid crystal panel is schematically illustrated. In these drawings, the second electrode 14 in one pixel is illustrated in one cross section. That is, in these drawings, cross sections of three adjacent pixels are illustrated.

Figure 9:
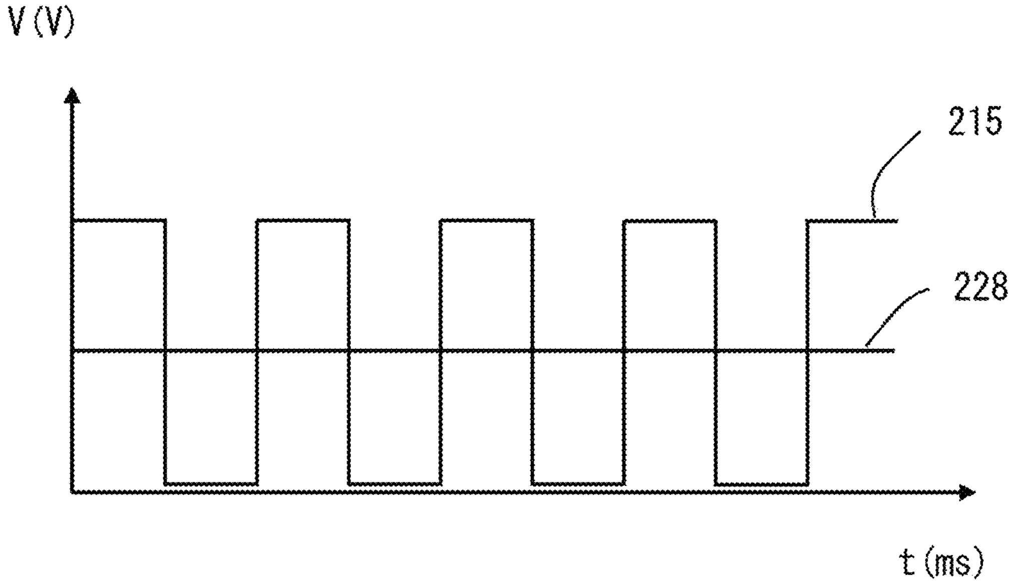
FIG. 9 shows an example of a waveform of a voltage applied to a first electrode and a second electrode in the first viewing angle mode.
Figure 10:
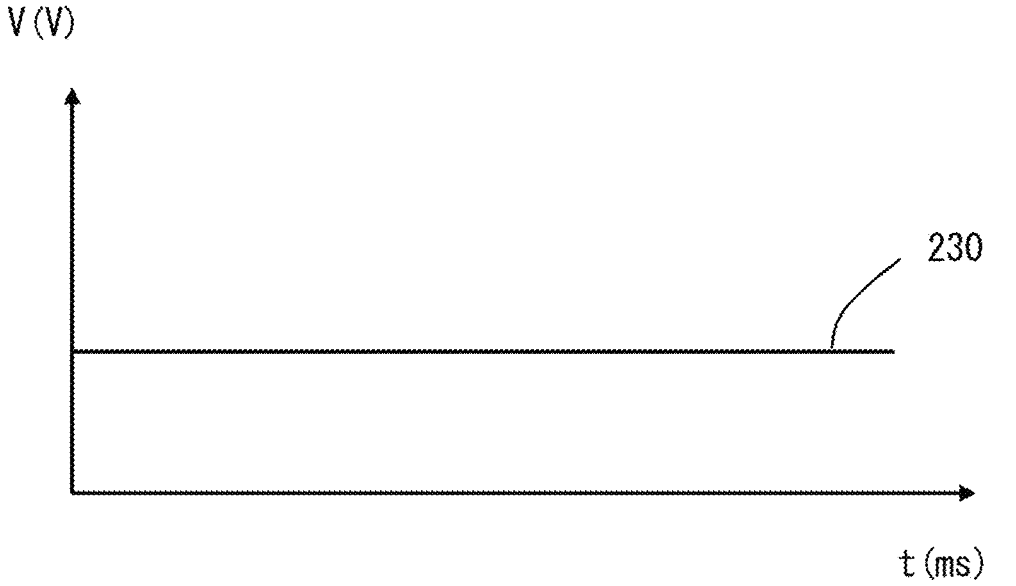
FIG. 10 shows an example of a waveform of a voltage applied to a third electrode in the first viewing angle mode.
Figure 11:
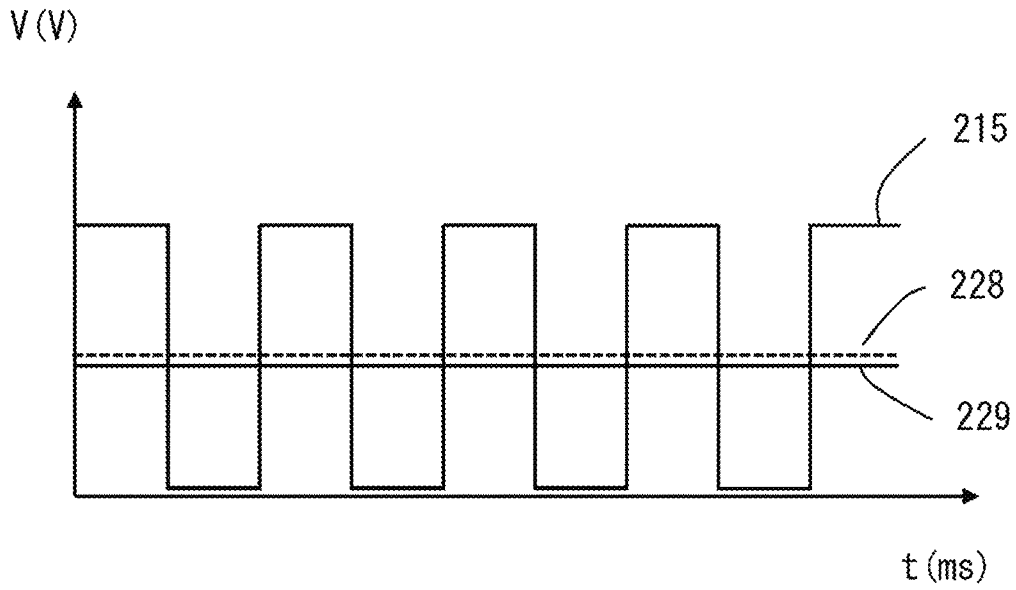
FIG. 11 shows an example of a waveform of a voltage applied to a first electrode and a second electrode in the second viewing angle mode.
Figure 12:
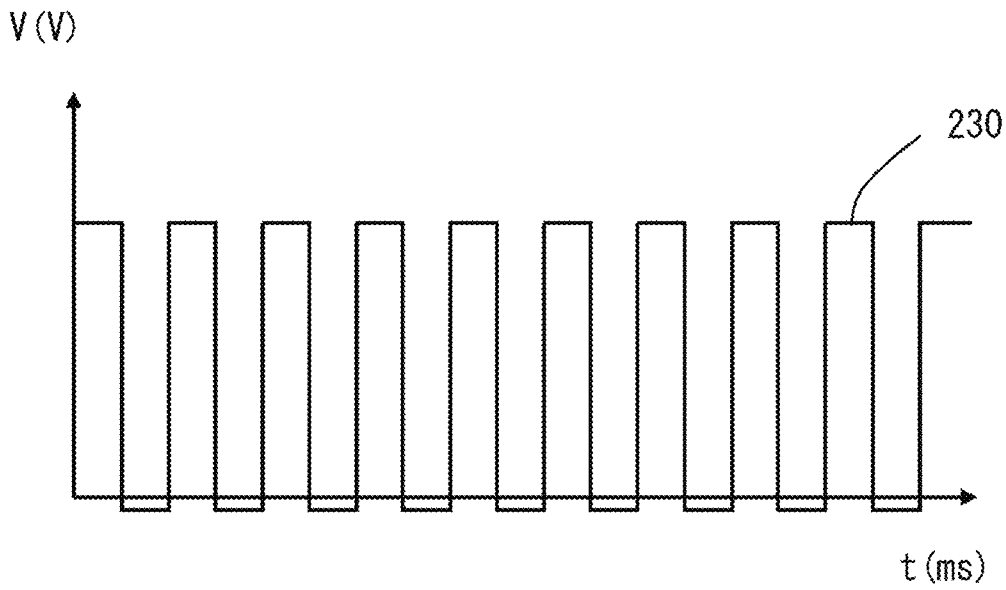
FIG. 12 shows an example of a waveform of a voltage applied to a third electrode in the second viewing angle mode.

FIG. 9 shows a waveform of a voltage applied to the first electrode 12 and the second electrode 14 in the first viewing angle mode, and FIG. 10 shows a waveform of a voltage applied to the third electrodes 25 in the first viewing angle mode. FIG. 11 shows a waveform of a voltage applied to the first electrode 12 and the second electrode 14 in the second viewing angle mode, and FIG. 12 shows a waveform of a voltage applied to the third electrodes 25 in the second viewing angle mode. Table 1 shows an example of voltage values applied to the first electrode 12, the second electrode 14, and the third electrode 25.

TABLE 1

| Electrode | Applied voltage: First viewing angle mode (Wide viewing angle mode) | Applied voltage: Second viewing angle mode (Narrow viewing angle mode) |
|---|---|---|
| First electrode | 6.27 V | 6.1 V |
| Second electrode | High level: 12.32 V<br>Low level: 0.25 V<br>Amplitude: 6.035 V<br>Effective voltage (median value): 6.285 V | High level: 12.32 V<br>Low level: 0.25 V<br>Amplitude: 6.035 V<br>Effective wave voltage (median value): 6.285 V |
| Third electrode | 6.27 V | High level: 13.6 V<br>Low level: −1.4 V<br>Amplitude: 7.5 V<br>Effective voltage (median value): 6.1 V |

As shown in Table 1 and as illustrated in FIGS. 6A, 6B, 9, and 10, in the first viewing angle mode, the first common voltage 228 that is a constant voltage is applied to the first electrode 12. The voltage applied to the second electrode 14 is switched between a high level and a low level on a frame-by-frame basis. This voltage is an alternating voltage whose amplitude is ½ of the difference between the high level and the low level. The voltage applied to the second electrode 14 is also a data signal. In FIGS. 9 and 11, the high level and the low level of the rectangular wave voltage are illustrated as being constant between frames, but are determined to be a high level and a low level corresponding to the gray scale level according to the luminance of each pixel of an image to be displayed. The high level and the low level indicated in Table 1 represent, for example, voltage levels corresponding to the highest luminance (white display) in a case where the luminance is expressed in a gray scale of 0 to 255. In a case of the lowest luminance (black display), the voltage is a constant voltage in which the amplitude is 0, and the high level and the low level are equal to each other.

As illustrated in FIGS. 6A and 6B, rectangular wave voltages with inverted phases are applied to the second electrode 14 in the adjacent pixels. As shown in FIG. 10, a constant voltage equal to the constant voltage applied to the first electrode 12, that is, a constant voltage having the same magnitude as the first common voltage 228 is applied to the third electrodes 25. Electrical fields are generated among the first electrode 12, the second electrode 14, and the third electrodes 25 as indicated by arrows in FIGS. 6A and the 6B. FIG. 6A illustrates a state in which a high-level voltage is applied to the second electrode 14 located at the center, and FIG. 8B illustrates a state in which a low-level voltage is applied to the second electrode 14 located at the center. Similarly, FIGS. 7A and 8A also illustrate a state in which a high-level voltage is applied to the second electrode 14 located at the center, and FIGS. 7B and 8B illustrate a state in which a low-level voltage is applied to the second electrode 14 located at the center.

In the first viewing angle mode, a constant voltage having the same waveform and the same magnitude as the voltage applied to the first electrode 12 is applied to the third electrodes 25. Thus, in the liquid crystal display device 101, a transverse electrical field is applied to liquid crystal molecules of the liquid crystal layer 30, and the liquid crystal molecules are aligned parallel to the active matrix substrate 10, similarly to a normal FFS mode liquid crystal display device. The intensity of the transverse electrical field varies depending on the amplitude of a data signal, which is a voltage applied to the second electrode 14, and thereby a degree of alignment of the liquid crystal molecules can be adjusted. Accordingly, a gray scale display is obtained. Note that the directions of the electrical fields formed between the first electrode 12 and the second electrode 14 are opposite between FIGS. 6A and 6B. Thus, the directions of polarization of the liquid crystal molecules aligned in parallel are reversed.

As shown in Table 1 and as illustrated in FIGS. 7A, 7B, 8A, 8B, 11, and 12, in the second viewing angle mode, the second common voltage 229, which is a constant voltage different from the first common voltage 228, is applied to the first electrode 12. The second common voltage 229 has a value less than the first common voltage 228. As in the case of the first viewing angle mode, a rectangular wave voltage that is a data signal is applied to the second electrode 14.

A rectangular wave voltage (a drive signal for generating a vertical electrical field), one period of which is n times (n is an integer) a frame frequency, is applied to the third electrodes 25. In FIG. 12, for ease of viewing, a waveform in a case where n is 2 is illustrated. The amplitude of this voltage is greater than the amplitude of the rectangular wave voltage applied to the second electrode 14 when the highest luminance (white display) is displayed.

Figure 7A:
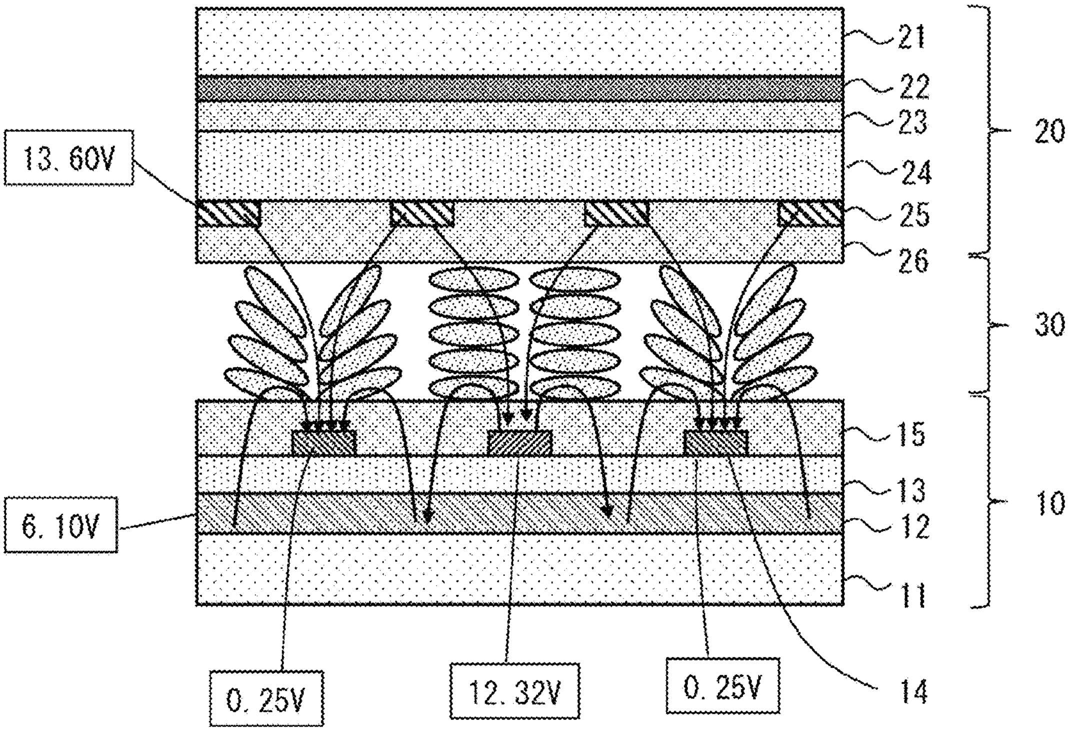
FIG. 7A is a schematic view illustrating the alignment of liquid crystal molecules when the liquid crystal panel is driven in a second viewing angle mode.
Figure 7B:
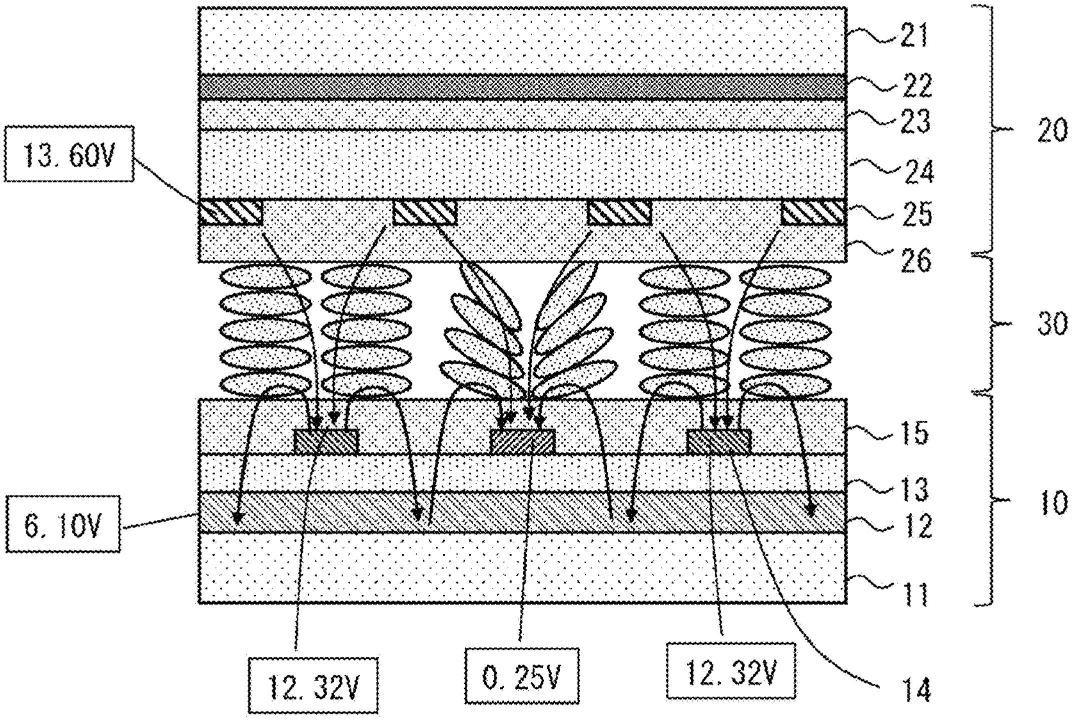
FIG. 7B is a schematic view illustrating the alignment of liquid crystal molecules when the liquid crystal panel is driven in the second viewing angle mode.

When the third electrodes 25 are at the high level of the rectangular wave voltage, electrical fields are generated between the first electrode 12, the second electrode 14, and the third electrodes 25 as illustrated in FIGS. 7A and 7B. At or near the second electrode 14 to which a high-level voltage is applied, a voltage applied to the second electrode 14 and a voltage applied to the third electrodes 25 are substantially equal to each other. Thus, the electrical fields between the second electrode 14 and the first electrode 12 become dominant, and the liquid crystal molecules are aligned by a transverse electrical field. On the other hand, at or near the second electrode 14 to which a low-level voltage is applied, the electrical fields directed from the third electrodes 25 to the second electrode 14 have greater effective components. Thus, at or near the second electrode 14 to which a high-level voltage is applied, the liquid crystal molecules have a greater tilt angle and a narrower viewing angle.

Figure 8A:
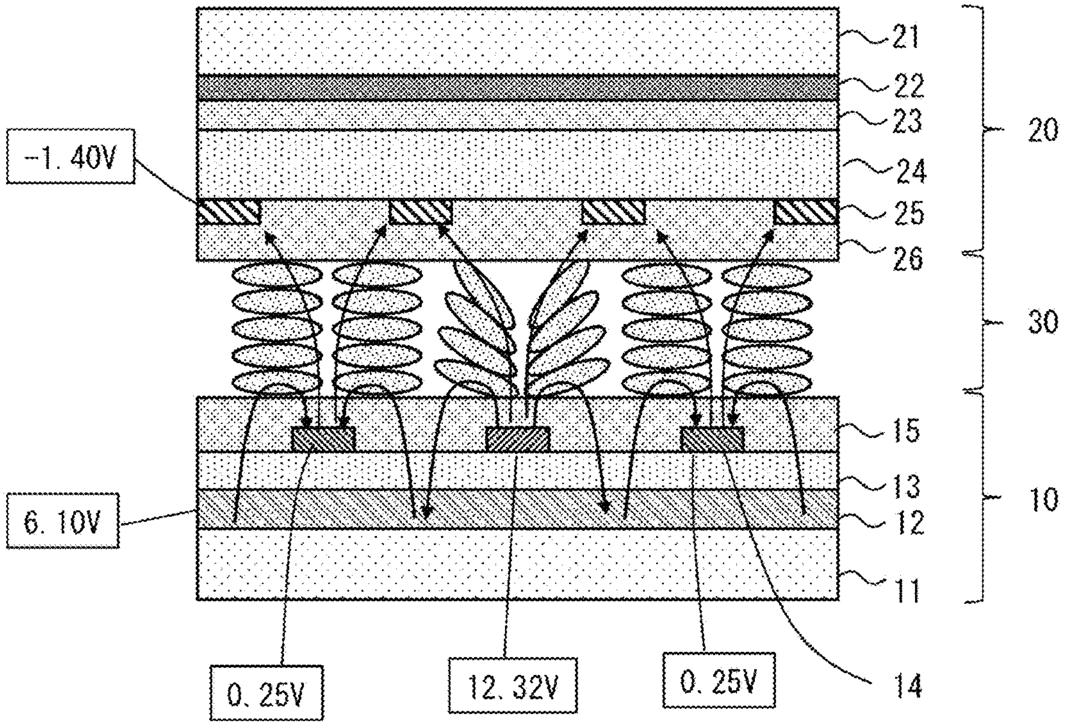
FIG. 8A is a schematic view illustrating the alignment of liquid crystal molecules when the liquid crystal panel is driven in the second viewing angle mode.
Figure 8B:
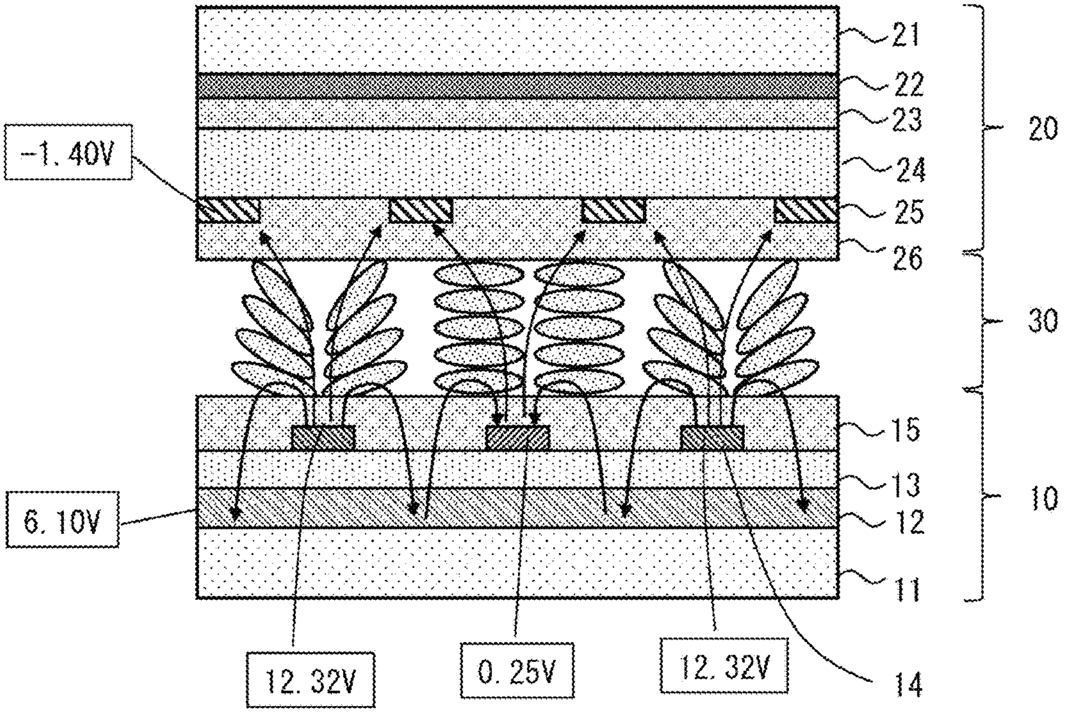
FIG. 8B is a schematic view illustrating the alignment of liquid crystal molecules when the liquid crystal panel is driven in the second viewing angle mode.

When the third electrodes 25 are at the low level of the rectangular wave voltage, electrical fields are generated between the first electrode 12, the second electrode 14, and the third electrodes 25 as illustrated in FIGS. 8A and 8B.

A voltage applied to the second electrode 14 to which a low-level voltage is applied, and a voltage applied to the third electrodes 25 are substantially equal to each other. Thus, the electrical fields between the second electrode 14 and the first electrode 12 become dominant, and the liquid crystal molecules are aligned by a transverse electrical field. On the other hand, at or near the second electrode 14 to which a high-level voltage is applied, the electrical fields directed from the second electrode 14 to the third electrodes 25 have greater effective components. Thus, at or near the second electrode 14 to which a high-level voltage is applied, the liquid crystal molecules have a greater tilt angle and a narrower viewing angle.

In the first viewing angle mode, the same first common voltage 228 as that applied to the first electrode 12 is applied to the third electrodes 25. In addition, an intermediate value between the high level and the low level of the voltage applied to the second electrode 14, that is, an effective voltage applied to the second electrode 14 is also substantially coincident with the first common voltage 228. Thus, no electrical field is applied to the liquid crystal layer 30 in the vertical direction, and image sticking is less likely to occur in the liquid crystal panel 50.

On the other hand, in the second viewing angle mode, a rectangular wave voltage is applied to the third electrodes 25. In this rectangular wave voltage, the periods of the high level and the low level are equal to each other, but the effective voltage is 6.1 V, which is lower than the effective voltage of the rectangular wave voltage applied to the second electrode 14. As a result, when the voltage applied to the first electrode 12 is the first common voltage 228, an electrical field is applied to the liquid crystal layer 30 in the vertical direction. Accordingly, image sticking may occur in the liquid crystal panel 50.

In the liquid crystal display device 101 according to the present embodiment, in order to suppress image sticking, the voltage applied to the first electrode 12 is changed from the first common voltage 228 to the second common voltage 229 in the second viewing angle mode. The second common voltage 229 is lower than the first common voltage 228 and is equal to the effective value of the rectangular wave voltage applied to the third electrodes. Accordingly, bias of charge generated in a dielectric including the liquid crystal layer 30 during the driving of the liquid crystal panel 50 is reduced, and image sticking in the liquid crystal panel 50 is suppressed.

As described above, according to the present embodiment, since the liquid crystal display device includes the active matrix substrate including the first electrode and the second electrode that generate a transverse electrical field and the counter substrate including the third electrodes, an image can be displayed in the wide viewing angle mode or an image can be displayed in the narrow viewing angle mode depending on a voltage applied to the third electrodes. Further, by differentiating the voltage applied to the first electrode between the wide viewing angle mode and the narrow viewing angle mode, image sticking can be suppressed in the liquid crystal panel.

Second Embodiment

Figure 13:
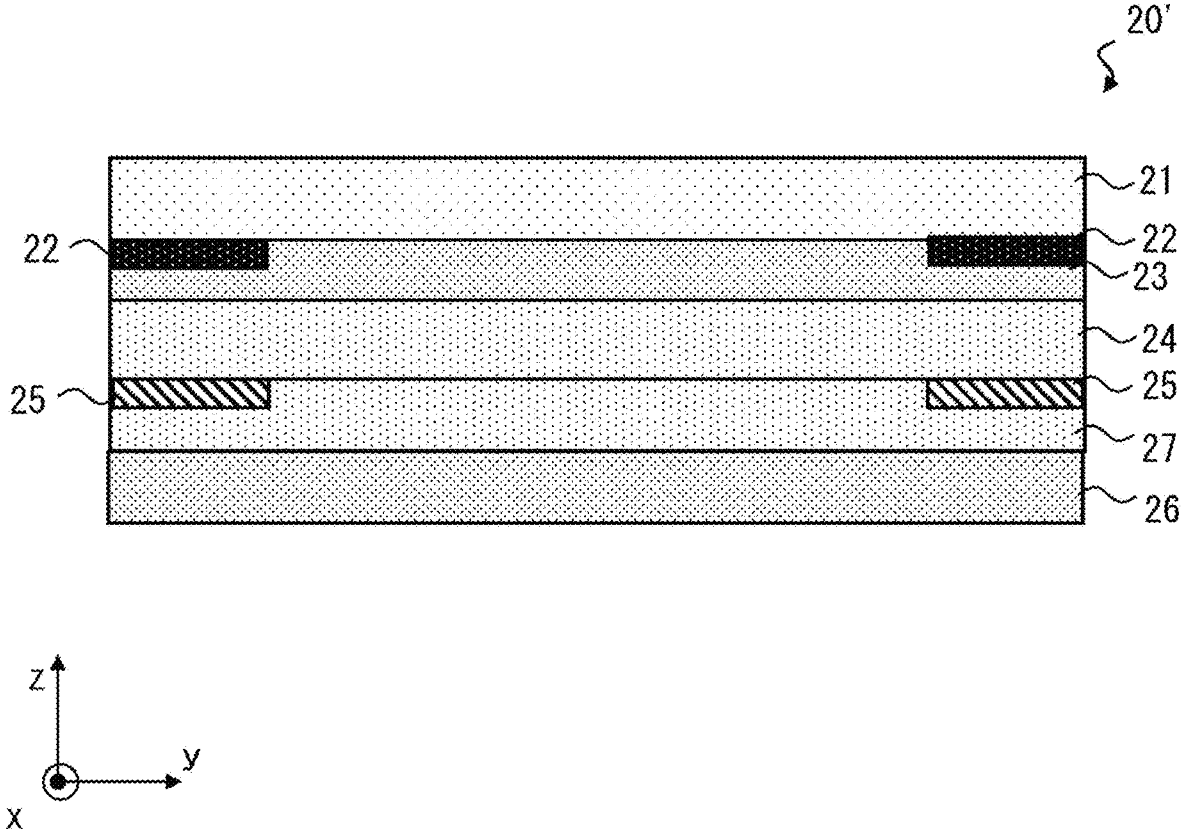
FIG. 13 is a cross-sectional view illustrating a structure corresponding to one pixel of a counter substrate of a liquid crystal display device according to a second embodiment.

FIG. 13 schematically illustrates a cross section of a counter substrate 20' of a liquid crystal display device according to the present embodiment. The liquid crystal display device according to the present embodiment is different from the liquid crystal display device according to the first embodiment in that the counter substrate 20' further includes an overcoat layer 27 between the third electrodes 25 and the alignment film 26. The overcoat layer 27 is disposed on the overcoat layer 24 so as to cover the third electrodes 25, and the alignment film 26 is disposed on the overcoat layer 27.

By further providing the overcoat layer 27, the intensity of an electrical field applied to the liquid crystal layer 30 in the vertical direction is reduced. Accordingly, when a rectangular wave voltage is applied to the third electrodes 25, the tilt angle of the liquid crystal molecules of the liquid crystal layer 30 can be made narrower than that in the first embodiment, and the range of viewing angle limitation can be more easily adjusted. Table 2 shows an example of voltages applied to the first electrode 12, the second electrode 14, and the third electrodes 25 of the liquid crystal display device according to the second embodiment.

TABLE 2

| | Applied voltage | |
|---|---|---|
| Electrode | First viewing angle mode (Wide viewing angle mode) | Second viewing angle mode (Narrow viewing angle mode) |
| First electrode | 6.21 V | 5.99 V |
| Second electrode | High level: 12.32 V<br>Low level: 0.25 V<br>Amplitude: 6.035 V<br>Effective voltage (median value): 6.285 V | High level: 12.32 V<br>Low level: 0.25 V<br>Amplitude: 6.035 V<br>Effective voltage (median value): 6.285 V |
| Third electrode | 6.21 V | High level: 13.49 V<br>Low level: −1.52 V<br>Amplitude: 7.505 V<br>Effective voltage (median value): 5.985 V |

Also, in the liquid crystal display device according to the second embodiment, in the second viewing angle mode, the second common voltage 229, which is lower than the first common voltage 228 applied in the first viewing angle mode, is applied to the first electrode 12. Accordingly, as in the case of the first embodiment, since the liquid crystal display device includes the active matrix substrate including the first electrode and the second electrode that generate a transverse electrical field and the counter substrate including the third electrodes, an image can be displayed in the wide viewing angle mode or an image can be displayed in the narrow viewing angle mode depending on a voltage applied to the third electrodes. Further, by differentiating the voltage applied to the first electrode between the wide viewing angle mode and the narrow viewing angle mode, image sticking can be suppressed in the liquid crystal panel.

Other Embodiments

Various modifications may be made to the liquid crystal display device according to the disclosure. For example, the shapes of the electrodes illustrated in the embodiments described above are examples, and the first electrode, the second electrode, and the third electrode may have other shapes. The voltage applied to each electrode is also an example, and may be determined according to the shape of the electrode, the dielectric constant of a member other than the electrode, the size of a pixel, and the like.

In the embodiments described above, the second electrode 14 is used as a pixel electrode, and a data signal is input to the second electrode 14. However, the first electrode 12 may be used as a pixel electrode and a data signal may be input to the first electrode 12. In that case, a switching element is connected to the first electrode 12 to control an operation on a pixel-by-pixel basis. Also in that case, a first common voltage and a second common voltage are input to the second electrode 14.

EXAMPLE 1

Figure 14:
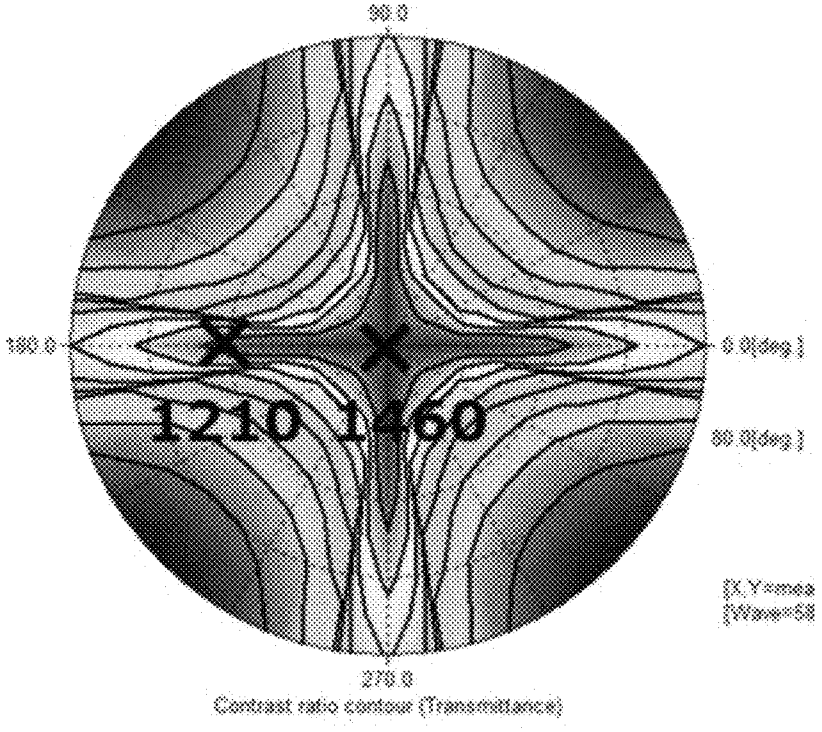
FIG. 14 illustrates a result of measuring a contrast viewing angle when the liquid crystal display device of the first embodiment is driven under conditions shown in Table 1.
Figure 15:
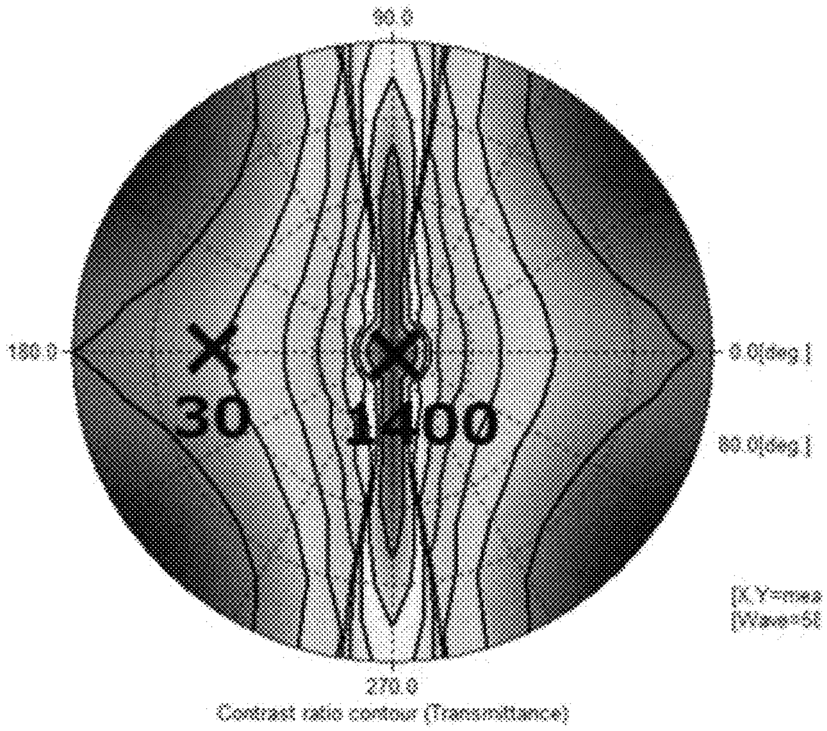
FIG. 15 illustrates a result of measuring a contrast viewing angle when the liquid crystal display device according to the first embodiment is driven under the conditions shown in Table 1.

A liquid crystal display device according to the present embodiment was prepared, and evaluated in terms of viewing angles and image sticking. FIGS. 14 and 15 illustrate the results of measuring contrast viewing angles when the liquid crystal display device according to the first embodiment is driven under the conditions shown in Table 1. FIG. 14 illustrates the result in the first viewing angle mode, and FIG. 15 illustrates the result in the second viewing angle mode. The numbers in each of the drawings indicate contrasts when a polar angle is 0° (in a direction perpendicular to the screen) and when the polar angle is 45°, respectively. As illustrated in FIGS. 14 and 15, in the first viewing angle mode, while a contrast obtained when the polar angle is 45° is about 80% of a contrast obtained when the polar angle is 0°. On the other hand, in the second viewing angle mode, a contrast obtained when the polar angle is 45° is significantly reduced to about 2%. That is, this means that the viewing angle can be favorably limited.

Figure 16:
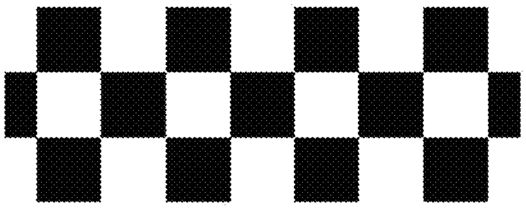
FIG. 16 illustrates a display pattern of an image used in performing an image sticking evaluation.

Next, the liquid crystal display devices according to the first embodiment and the second embodiment were evaluated in terms of image sticking. A checker pattern composed of white and black as illustrated in FIG. 16 was displayed, and the display was switched to an entirely gray screen (V32 gray scale in the present example) at regular time intervals, and the luminance of portions that had displayed white and the luminance of portions that had displayed black in the checker pattern were measured to obtain a luminance ratio. This test was continued for 48 hours in each of the first viewing angle mode and the second viewing angle mode.

For a comparison purpose, a liquid crystal display device which has the same structure as the liquid crystal display device according to the second embodiment and to which a voltage was applied under the conditions shown in Table 3 below was evaluated as a comparative example in the same manner. In the comparative example, common voltages having the same value were applied to the first electrode in the first viewing angle mode and the second viewing angle mode.

TABLE 3

| | Applied voltage | |
|---|---|---|
| Electrode | First viewing angle mode (Wide viewing angle mode) | Second viewing angle mode (Narrow viewing angle mode) |
| First electrode | 6.25 V | 6.25 V |
| Second electrode | High level: 12.32 V<br>Low level: 0.25 V<br>Amplitude: 6.035 V<br>Effective voltage (median value): 6.285 V | High level: 12.32 V<br>Low level: 0.25 V<br>Amplitude: 6.035 V<br>Effective voltage (median value): 6.285 V |
| Third electrode | 6.25 V | High level: 13.75 V<br>Low level: −1.25 V<br>Amplitude: 7.5 V<br>Effective voltage (median value): 6.25 V |

Figure 17:
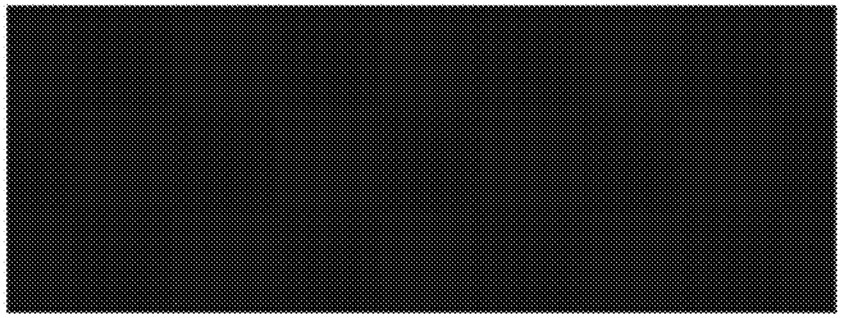
FIG. 17 illustrates a result of an image sticking evaluation on the liquid crystal display device according to the first embodiment, showing a result of displaying a V32 gray scale on the liquid crystal display device stored in the second viewing angle mode.
Figure 19:
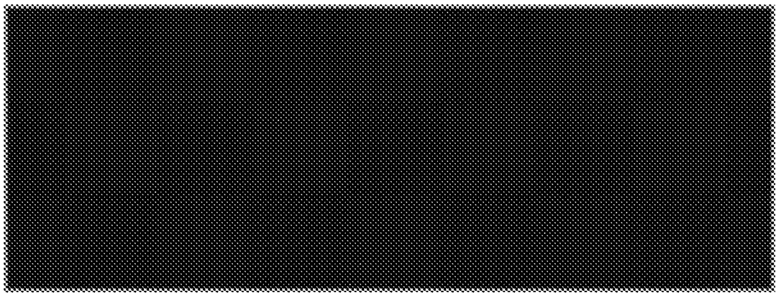
FIG. 19 illustrates a result of an image sticking evaluation on the liquid crystal display device according to the second embodiment, showing a result of displaying a V32 gray scale on the liquid crystal display device stored in the second viewing angle mode.
Figure 21:
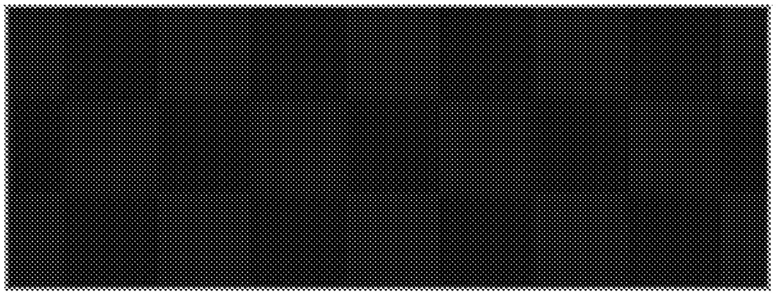
FIG. 21 illustrates a result of an image sticking evaluation on a liquid crystal display device of a comparative example, showing a result of displaying a V32 gray scale on the liquid crystal display device stored in the second viewing angle mode.

FIGS. 17, 19, and 21 respectively illustrate the results of displaying a V32 gray scale on the liquid crystal display devices of the first embodiment, the second embodiment, and the comparative example which were subjected to an image sticking test in the second viewing angle mode. In these drawings, the results are illustrated in a gray scale different from the actual V32 gray scale for ease of viewing.

As illustrated in FIGS. 17 and 19, almost no image sticking occurred in the liquid crystal display devices of the first embodiment and the second embodiment, and thus almost no checker pattern appeared in the V32 gray scale on the screens. On the other hand, as shown in FIG. 20, in the liquid crystal display device of the comparative example, there is a difference in luminance between the portions that had displayed white and the portions that had displayed black due to image sticking, and the checker pattern can be recognized.

Figure 18:
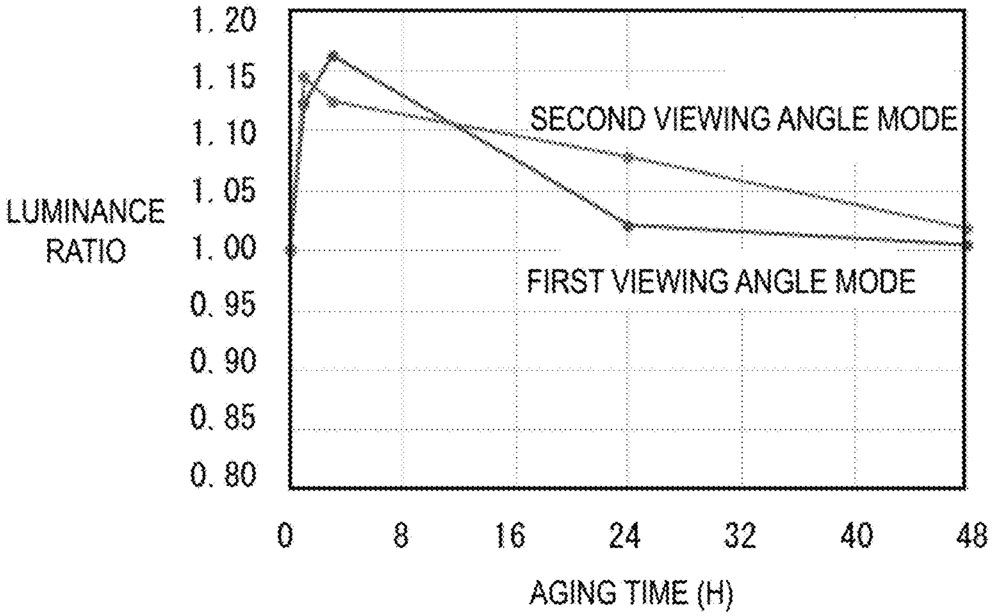
FIG. 18 shows the result of the image sticking evaluation on the liquid crystal display device according to the first embodiment, showing changes in luminance ratio in the first viewing angle mode and the second viewing angle mode.
Figure 20:
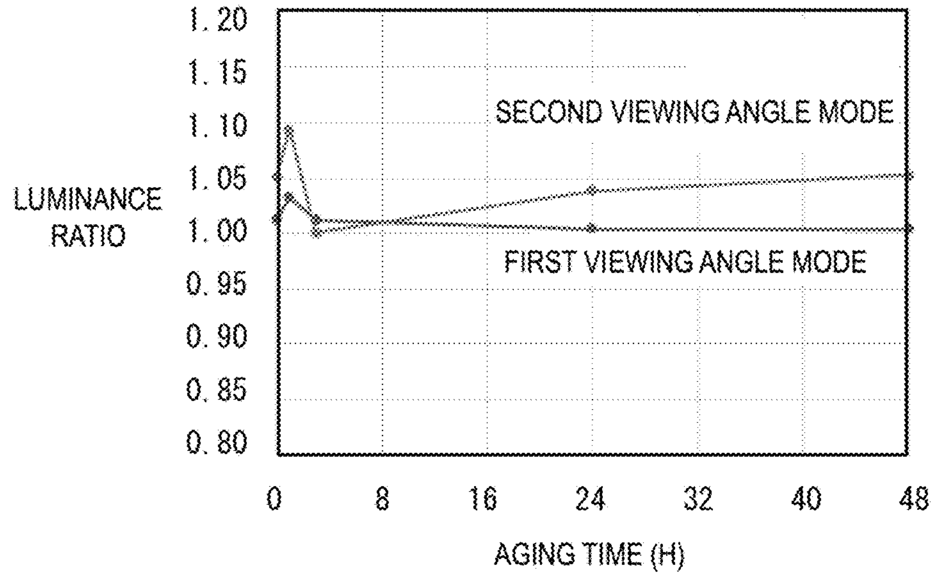
FIG. 20 shows the result of the image sticking evaluation on the liquid crystal display device according to the second embodiment, showing changes in luminance ratio in the first viewing angle mode and the second viewing angle mode.
Figure 22:
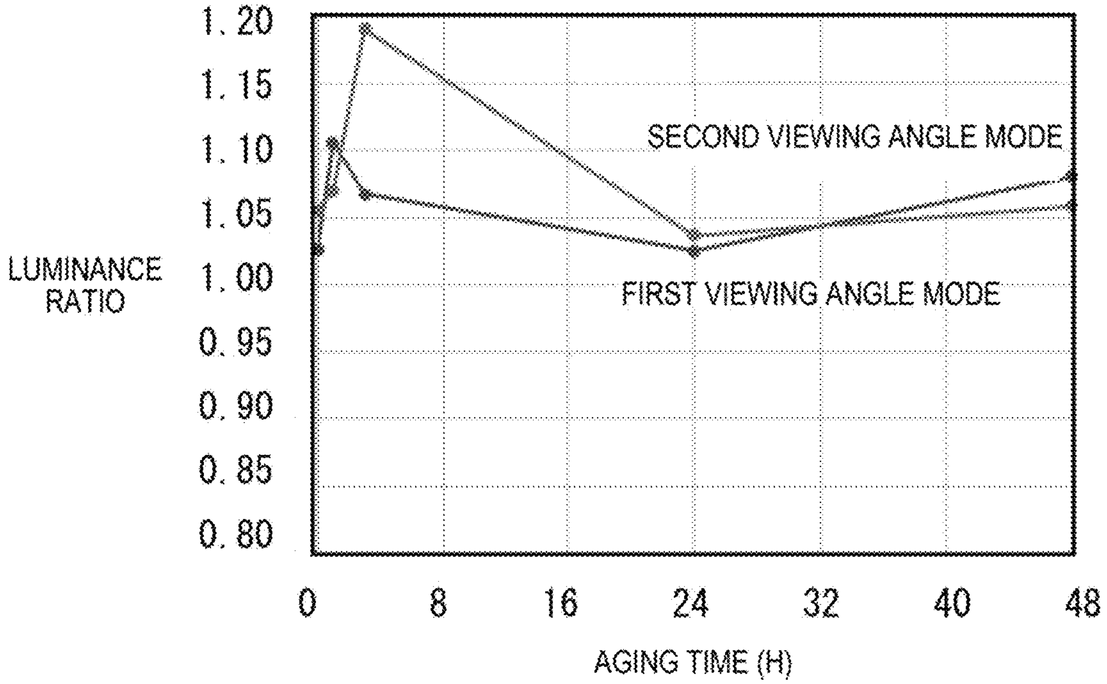
FIG. 22 shows the result of the image sticking evaluation on the liquid crystal display device of the comparative example, showing changes in luminance ratio in the first viewing angle mode and the second viewing angle mode.

FIGS. 18, 20, and 22 show changes in the luminance ratios in the first viewing angle mode and the second viewing angle mode. As shown in FIG. 18 and FIG. 20, in the liquid crystal display devices of the first embodiment and the second embodiment, the luminance ratios once increased for several hours after the start of the test, and then substantially decreased. Then, after a lapse of 48 hours, the luminance ratios were kept equal to or below 1.05 in both the first viewing angle mode and the second viewing angle mode. On the other hand, as shown in FIG. 22, in the liquid crystal display device of the comparative example, the luminance ratios once increased for several hours after the start of the test and then decreased, but the luminance ratios increased again after a lapse of 24 hours. After a lapse of 48 hours, the luminance ratio was 1.05 or greater in the both modes. The comparative example indicates that the luminance ratios may increase after the lapse of 48 hours.

These results show that, according to the liquid crystal display device according to the present embodiment, image sticking can be suppressed in the liquid crystal panel 50 by differentiating the magnitude of the common voltage applied to the first electrode 12 between the first viewing angle mode and the second viewing angle mode.

EXAMPLE 2

For three samples of the liquid crystal display device according to the first embodiment, the amplitude of a rectangular wave voltage to be applied to the third electrodes was set to 0 V, 7.5 V and 10 V, and a voltage applied to the first electrode was adjusted such that the contrast between a white display and a black display calculated based on an average luminance of two adjacent pixels having opposite polarities became the highest, and the value of the voltage was obtained. When the amplitude of the rectangular wave voltage to be applied to the third electrodes is 0 V, a drive mode is the first viewing angle mode in which a constant voltage is applied to the third electrodes, and when the amplitude of the rectangular wave voltage to be applied to the third electrodes is 7.5 V or 10 V, a drive mode is the second viewing angle mode.

In addition, the voltage applied to the first electrode was obtained by a liquid crystal simulator under the conditions below.

Physical property values of a liquid crystal material (values at 20° C.)

$\Delta n$: 0.120

$\Delta\varepsilon$: 2.6

Cell gap: typ. 3.1 μm (2.9 μm to 3.3 μm)

Figure 23:
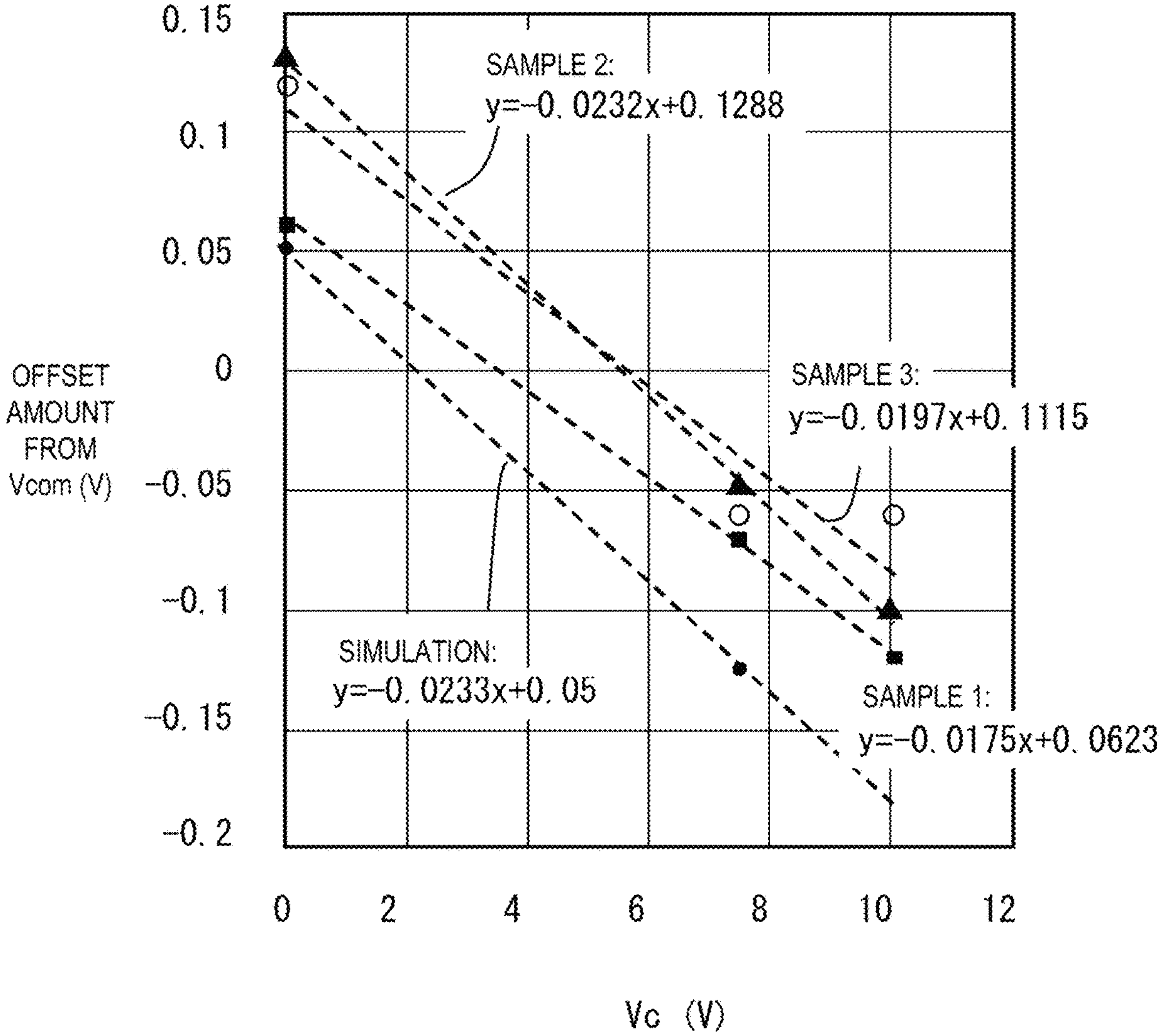
FIG. 23 is a diagram showing a relationship between an amplitude of a rectangular wave voltage applied to the third electrode and a common voltage obtained through an experiment.

The results are shown in FIG. 23. The horizontal axis represents the amplitude Vc (V) of the rectangular wave voltage applied to the third electrodes 25. The vertical axis represents an optimum common voltage to be applied to the first electrode 12 as an offset amount from a common voltage $V_{com}$ to be applied to an FFS mode liquid crystal display device including no third electrode. The FFS mode liquid crystal display device including no third electrode is a liquid crystal display device that includes an active matrix substrate including electrodes generating a transverse electrical field, a counter substrate including no third electrode, and a liquid crystal layer located between the active matrix substrate and the counter substrate, and is a liquid crystal display device that does not include third electrodes in the liquid crystal panel of the first embodiment and the second embodiment.

In FIG. 23, when the amplitude Vc (V) is 0, a constant voltage is applied to the third electrodes. That is, a voltage to be applied to the third electrodes 25 in the first viewing angle mode in which the viewing angle is not limited is indicated. As shown in FIG. 23, in the samples with different setting conditions, the offset amounts when Vc is 0 volts are different from each other, but the slopes of the samples are similar to each other.

That is, it can be seen that, when the amplitude of the rectangular wave voltage applied to the third electrodes is x (V), and the first common voltage 228 and the second common voltage 229 are respectively $V_{com1}$ (V) and $V_{com2}$ (V), the second common voltage 229 is represented by the equation below:

$V_{com2}=V_{com1}+ax$ (where a<0) (1). According to the samples 1 to 3 and the simulation results in FIG. 23, the a satisfies the inequality below:

$$-0.025<a<-0.015$$

When an offset voltage from $V_{com}$ is y (V), it can be seen that the voltage is shifted from $V_{com}$ by the offset voltage y (V) represented by the equation (2) below.

$$y=ax+b \text{ (where } a<0,\ b\geq 0)$$

$$0<b<0.2$$

$$-0.025<a<-0.015 \quad (2)$$

Ideally, when the amplitude of the rectangular wave voltage applied to the third electrodes is x (V), the offset voltage y (V) is considered to satisfy the equation (3) below.

$$y(V)=-0.0233x+0.05 \quad (3)$$

That is, when the amplitude of the rectangular wave voltage applied to the third electrodes is x (V), it is conceivable that the voltage applied to the first electrode 12 in the second viewing angle mode can be estimated as represented by the equation (1), (2), or (3).

As described above, the study result of Example 2 shows that the first common voltage 228 and the second common voltage 229 applied to the first electrode 12 or the value of the difference between the first common voltage 228 and the second common voltage 229 can be estimated based on the amplitude of the voltage applied to the third electrodes 25.

A liquid crystal display device and a method for controlling a liquid crystal display device according to the disclosure can be explained as follows.

A liquid crystal display device according to a first configuration includes: an active matrix substrate including at least one first electrode and at least one second electrode that generate a transverse electrical field; a counter substrate including a plurality of third electrodes disposed at predetermined intervals and having a stripe pattern; a liquid crystal layer located between the active matrix substrate and the counter substrate; and a control circuit. The liquid crystal display device can display an image in a first viewing angle mode and a second viewing angle mode having a viewing angle narrower than a viewing angle of the first viewing angle mode by the control circuit switching an amplitude and a waveform of a voltage applied to the third electrodes. The control circuit applies a common voltage having a different value to the first electrode or the second electrode in each of the first viewing angle mode and the second viewing angle mode.

According to the liquid crystal display device according to the first configuration, since the liquid crystal display device includes the active matrix substrate including the first electrode and the second electrode that generate a transverse electrical field and the counter substrate including the third electrodes, an image can be displayed in a wide viewing angle mode or an image can be displayed in a narrow viewing angle mode depending on a voltage applied to the third electrodes. Further, by differentiating the voltage applied to the first electrode between the wide viewing angle mode and the narrow viewing angle mode, image sticking can be suppressed in the liquid crystal panel.

A liquid crystal display device according to a second configuration is the liquid crystal display device according to the first configuration, wherein the control circuit may apply a first common voltage to one of the first electrode and the second electrode in the first viewing angle mode, and may apply a second common voltage less than the first common voltage to the one of the first electrode and the second electrode in the second viewing angle mode.

A liquid crystal display device according to a third configuration is the liquid crystal display device according to the second configuration, wherein the control circuit may apply to the third electrodes a drive signal configured to generate a vertical electrical field between the third electrodes and the first electrode or the second electrode, and when an amplitude Vc of the drive signal is x (V) and the first common voltage and the second common voltage are respectively $V_{com1}$ (V) and $V_{com2}$ (V), equation (1) below may be satisfied.

$$V_{com2}=V_{com1}+ax \text{ (where } a<0) \quad (1)$$

A liquid crystal display device according to a fourth configuration is the liquid crystal display device according to the second configuration, wherein the control circuit may apply to the third electrodes a drive signal configured to generate a vertical electrical field between the third electrodes and the first electrode or the second electrode, and when an amplitude Vc of the drive signal in the first viewing angle mode and the second viewing angle mode is x (V) and a common voltage in a liquid crystal display device including an active matrix substrate including an electrode configured to generate a transverse electrical field, a counter substrate including no third electrode, and a liquid crystal layer located between the active matrix substrate and the counter substrate is $V_{com}$, the first common voltage and the second common voltage may be shifted from $V_{com}$ by an offset voltage y (V) represented by equation (2) below.

$$y=ax+b \text{ (where } a<0,\ b\leq 0) \quad (2)$$

A liquid crystal display device according to a fifth configuration is the liquid crystal display device according to the fourth configuration, wherein the b may satisfy the inequality below.

$$0<b<0.2$$

A liquid crystal display device according to a sixth configuration is the liquid crystal display device according to any of the third to the fifth configurations, wherein the a may satisfy the inequality below.

$$-0.025<a<-0.015$$

A liquid crystal display device according to a seventh configuration is the liquid crystal display device according to any of the first to the sixth configurations, wherein the counter substrate may further include an alignment film located so as to cover the plurality of third electrodes, and the alignment film may be in contact with the liquid crystal layer.

A liquid crystal display device according to an eighth configuration is the liquid crystal display device according to the seventh configuration, wherein the counter substrate may further include an overcoat layer located between the plurality of third electrodes and the alignment film.

A liquid crystal display device according to a ninth configuration is the liquid crystal display device according to any of the first to the eighth configurations, wherein the active matrix substrate may further include a first substrate having a plurality of pixel regions and an insulating layer, the active matrix substrate may include, in each of the pixel regions, the first electrode that is continuously disposed all over each of the pixel regions and a plurality of the second electrodes disposed on the first electrode via the insulating layer and extending in a first direction, and the plurality of third electrodes may extend in a second direction orthogonal to the first direction in plan view.

A liquid crystal display device according to a tenth configuration is the liquid crystal display device according to the ninth configuration, wherein each of the plurality of second electrodes may have a V shape with a bending part and extend in the first direction, and the plurality of second electrodes may have a plurality of slits arrayed in the second direction.

A method for controlling a liquid crystal display device according to an eleventh configuration is a method for controlling a liquid crystal display device including an active matrix substrate including at least one first electrode and at least one second electrode configured to generate a transverse electrical field, a counter substrate including a plurality of third electrodes disposed at predetermined intervals and having a stripe pattern, and a liquid crystal layer located between the active matrix substrate and the counter substrate. In the method, an image can be displayed in a first viewing angle mode and a second viewing angle mode having a viewing angle narrower than a viewing angle of the first viewing angle mode by switching an amplitude and a waveform of a voltage applied to the third electrodes, and a common voltage having a different value is applied to the first electrode or the second electrode in each of the first viewing angle mode and the second viewing angle mode.

According to the method for controlling a liquid crystal display device according to the eleventh configuration, since the liquid crystal display device includes the active matrix substrate including the first electrode and the second electrode configured to generate a transverse electrical field and the counter substrate including the third electrodes, an image can be displayed in a wide viewing angle mode or an image can be displayed in a narrow viewing angle mode depending on a voltage applied to the third electrodes. Further, by differentiating the voltage applied to the first electrode between the wide viewing angle mode and the narrow viewing angle mode, image sticking can be suppressed in the liquid crystal panel.

A method for controlling a liquid crystal display device according to a twelfth configuration is the method for controlling a liquid crystal display device according to the eleventh configuration, wherein a first common voltage may be applied to one of the first electrode and the second electrode in the first viewing angle mode, and a second common voltage less than the first common voltage may be applied to the one of the first electrode and the second electrode in the second viewing angle mode.

A method for controlling a liquid crystal display device according to a thirteenth configuration is the method for controlling a liquid crystal display device according to the twelfth configuration, wherein a drive signal configured to generate a vertical electrical field between the third electrodes and the first electrode or the second electrode may be applied to the third electrodes, and when an amplitude Vc of the drive signal is x (V) and the first common voltage and the second common voltage are respectively $V_{com1}$ (V) and $V_{com2}$ (V), equation (1) below may be satisfied.

$$V_{com2}=V_{com1}+ax \text{ (where } a<0) \quad (1)$$

A method for controlling a liquid crystal display device according to a fourteenth configuration is the method for controlling a liquid crystal display device according to the twelfth configuration, wherein a drive signal configured to generate a vertical electrical field between the third electrodes and the first electrode or the second electrode may be applied to the third electrodes, and when an amplitude Vc of the drive signal in the first viewing angle mode and the second viewing angle mode is x (V) and a common voltage in a liquid crystal display device including an active matrix substrate including electrodes configured to generate a transverse electrical field, a counter substrate including no third electrode, and a liquid crystal layer located between the active matrix substrate and the counter substrate is $V_{com}$, the first common voltage and the second common voltage may be shifted from $V_{com}$ by an offset voltage y (V) represented by equation (2) below.

$$y=ax+b \text{ (where } a<0,\ b\geq 0) \quad (2)$$

A method for controlling a liquid crystal display device according to a fifteenth configuration is the method for controlling a liquid crystal display device according to the fourteenth configuration, wherein the b may satisfy the inequality below.

$$0<b<0.2$$

A method for controlling a liquid crystal display device according to a sixteenth configuration is the method for controlling a liquid crystal display device according to any of the thirteenth to the fifteenth configurations, wherein the a may satisfy the inequality below.

$$-0.025<a<-0.01$$

INDUSTRIAL APPLICABILITY

The liquid crystal display devices and the methods for controlling a liquid crystal display device according to the disclosure are suitably used for a mobile terminal used in a public space, such as a smartphone, a tablet terminal, and a notebook computer.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device comprising:

an active matrix substrate including at least one common electrode and at least one pixel electrode, the at least one common electrode and the at least one pixel electrode being configured to generate a transverse electrical field;

a counter substrate including a plurality of third electrodes disposed at predetermined intervals and having a stripe pattern;

a liquid crystal layer located between the active matrix substrate and the counter substrate; and a control circuit configured to apply to the at least one common electrode a common voltage that is constant, apply to the at least one pixel electrode a voltage based on an image signal, and apply to the third electrodes a first voltage that is constant or a second voltage that varies periodically, wherein the liquid crystal display device is configured to display an image in a first viewing angle mode and a second viewing angle mode having a viewing angle narrower than a viewing angle of the first viewing angle mode by the control circuit switching a voltage applied to the third electrodes between the first voltage and the second voltage, the control circuit is configured to apply a first common voltage to the at least one common electrode in the first viewing angle mode and apply a second common voltage having a different value from the first common voltage to the at least one common electrode in the second viewing angle mode, the control circuit applies the second common voltage being less than the first common voltage to the at least one common electrode in the second viewing angle mode, the control circuit applies to the third electrodes a drive signal having the second voltage and configured to generate a vertical electrical field between the third electrodes and the at least one pixel electrode, when an amplitude Vc of the drive signal is x and the first common voltage and the second common voltage are respectively $V_{com1}$ and $V_{com2}$, an equation (1) below is satisfied:

$$V_{com2}=V_{com1}+ax \quad (1);$$

where a<0, and x, $V_{com1}$, and $V_{com2}$ are given in volts, and when the amplitude Vc of the drive signal is x and a common voltage in a reference liquid crystal display device that includes a reference active matrix substrate including an electrode configured to generate a transverse electrical field, a reference counter substrate including no third electrode, and a reference liquid crystal layer located between the reference active matrix substrate and the reference counter substrate is $V_{com}$, the second common voltage is shifted from $V_{com}$ by an offset voltage y that is represented by an equation (2) below and the first common voltage is shifted from $V_{com}$ by b:

$$y=ax+b \quad (2),$$

where b≥0, and y is given in volts.

2. The liquid crystal display device according to claim 1, wherein the b satisfies the inequality below:

$$0<b<0.2.$$

3. A method for controlling a liquid crystal display device including an active matrix substrate having at least one common electrode and at least one pixel electrode configured to generate a transverse electrical field, a counter substrate having a plurality of third electrodes disposed at predetermined intervals and having a stripe pattern, and a liquid crystal layer located between the active matrix substrate and the counter substrate, the method comprising:

applying to the at least one common electrode a common voltage that is constant;

applying to the at least one pixel electrode a voltage based on an image signal;

applying to the third electrodes a first voltage that is constant or a second voltage that varies periodically;

displaying an image in a first viewing angle mode and a second viewing angle mode having a viewing angle narrower than a viewing angle of the first viewing angle mode by switching a voltage applied to the third electrodes between the first voltage and the second voltage, and applying a first common voltage to the at least one common electrode in the first viewing angle mode and applying a second common voltage having a different value from the first common voltage to the at least one common electrode in the second viewing angle mode, wherein the second common voltage being less than the first common voltage is applied to the at least one common electrode in the second viewing angle mode, a drive signal having the second voltage and configured to generate a vertical electrical field between the third electrodes and the at least one pixel electrode is applied to the third electrodes, when an amplitude Vc of the drive signal is x and the first common voltage and the second common voltage are respectively $V_{com1}$ and $V_{com2}$, an equation (1) below is satisfied:

$$V_{com2}=V_{com1}+ax \quad (1);$$

where a<0, and x, $V_{com1}$, and $V_{com2}$ are given in volts, and when the amplitude Vc of the drive signal is x and a common voltage in a reference liquid crystal display device including a reference active matrix substrate including an electrode configured to generate a transverse electrical field, a reference counter substrate including no third electrode, and a reference liquid crystal layer located between the reference active matrix substrate and the reference counter substrate is $V_{com}$, the second common voltage is shifted from $V_{com}$ by an offset voltage y that is represented by equation (2) below and the first common voltage is shifted from $V_{com}$ by b:

$$y=ax+b \quad (2);$$

where b≥0, and y is given in volts.

4. The method for controlling a liquid crystal display device according to claim 3, wherein the b satisfies the inequality below:

$$0<b<0.2.$$

* * * * *